(12) United States Patent
Duteil et al.

(10) Patent No.: US 10,678,421 B2
(45) Date of Patent: Jun. 9, 2020

(54) CONTROL OF A HOST STATION THROUGH MOVEMENT OF A MOVING DEVICE

(71) Applicant: EPAWN, Paris (FR)

(72) Inventors: Christophe Duteil, Paris (FR); Valentin Lefevre, Puteaux (FR)

(73) Assignee: STARBREEZE PARIS, Paris (FR)

( * ) Notice: Subject to any disclaimer, the term of this patent is extended or adjusted under 35 U.S.C. 154(b) by 74 days.

(21) Appl. No.: 14/759,075

(22) PCT Filed: Dec. 30, 2013

(86) PCT No.: PCT/FR2013/053286
§ 371 (c)(1),
(2) Date: Jul. 2, 2015

(87) PCT Pub. No.: WO2014/106718
PCT Pub. Date: Jul. 10, 2014

(65) Prior Publication Data
US 2015/0339021 A1    Nov. 26, 2015

(30) Foreign Application Priority Data
Jan. 4, 2013  (FR) ..................... 13 50079

(51) Int. Cl.
*G06F 3/0487* (2013.01)
*G06F 3/046* (2006.01)
(Continued)

(52) U.S. Cl.
CPC ........ *G06F 3/0487* (2013.01); *A63F 3/00643* (2013.01); *A63F 13/06* (2013.01);
(Continued)

(58) Field of Classification Search
CPC .......... G06F 3/046; G06F 3/011; G06F 3/014; G06F 3/0481; G06F 3/04815;
(Continued)

(56) References Cited

U.S. PATENT DOCUMENTS

| 6,262,711 B1 | 7/2001 | Cohen et al. |
| 7,828,295 B2 * | 11/2010 | Matsumoto ............. A63F 13/06 |
| | | 273/238 |
| 8,602,857 B2 * | 12/2013 | Morichau-Beauchant ................. |
| | | A63F 3/00214 |
| | | 273/236 |

(Continued)

FOREIGN PATENT DOCUMENTS

| FR | 1 255 334 A | 1/1961 |
| WO | 2005/078562 A1 | 8/2005 |
| WO | 2012/028827 A1 | 3/2012 |

OTHER PUBLICATIONS

International Search Report, dated Mar. 17, 2014, from corresponding PCT application.

*Primary Examiner* — Stephen G Sherman
(74) *Attorney, Agent, or Firm* — Young & Thompson

(57) ABSTRACT

A method for controlling a host device for at least one moving device including the following steps: determining a current position of the at least one moving device relative to an interaction surface of the host station using at least one electrical signal induced by at least one inductive magnetic field in at least one electric circuit of the host device associated with the interaction surface; recording the current position in a position history; using the history to compare a change of the position of the at least one device with at least one reference change diagram, the reference change diagram being associated with at least one reference movement; and activating a command of the host station on the basis of the reference movement, if the change corresponds to the reference movement.

21 Claims, 15 Drawing Sheets

(51) Int. Cl.
*A63F 3/00* (2006.01)
*G06F 3/0484* (2013.01)
*G06F 3/0346* (2013.01)
*A63F 13/20* (2014.01)
*A63F 9/04* (2006.01)

(52) U.S. Cl.
CPC ............ *G06F 3/0346* (2013.01); *G06F 3/046* (2013.01); *G06F 3/04842* (2013.01); *G06F 3/04847* (2013.01); *A63F 9/0468* (2013.01); *A63F 2300/1068* (2013.01); *A63F 2300/6045* (2013.01)

(58) Field of Classification Search
CPC .. G06F 3/03547; G06F 17/5004; G06F 17/10; B33Y 50/00; G06T 15/08; G06T 19/20; G06T 2200/24; G06T 2210/04; G06T 2210/21; G06T 2219/2016; G06T 2219/2021
See application file for complete search history.

(56) References Cited

U.S. PATENT DOCUMENTS

| | | | |
|---|---|---|---|
| 8,702,515 B2* | 4/2014 | Weston | A63H 30/04 463/39 |
| 8,708,821 B2* | 4/2014 | Barney | A63F 13/327 463/36 |
| 8,753,165 B2* | 6/2014 | Weston | A63H 3/00 340/10.1 |
| 8,923,885 B2* | 12/2014 | Lefevre | A63F 3/00643 367/127 |
| 8,974,295 B2* | 3/2015 | Maharbiz | A63F 3/00214 273/237 |
| 9,039,532 B2* | 5/2015 | Canessa | A63F 13/02 463/39 |
| 2004/0169594 A1* | 9/2004 | Ely | G01D 5/2073 341/22 |
| 2007/0015588 A1 | 1/2007 | Matsumoto et al. | |
| 2008/0238885 A1* | 10/2008 | Zachut | G06F 3/03545 345/174 |
| 2013/0157690 A1 | 6/2013 | Lefevre et al. | |

* cited by examiner

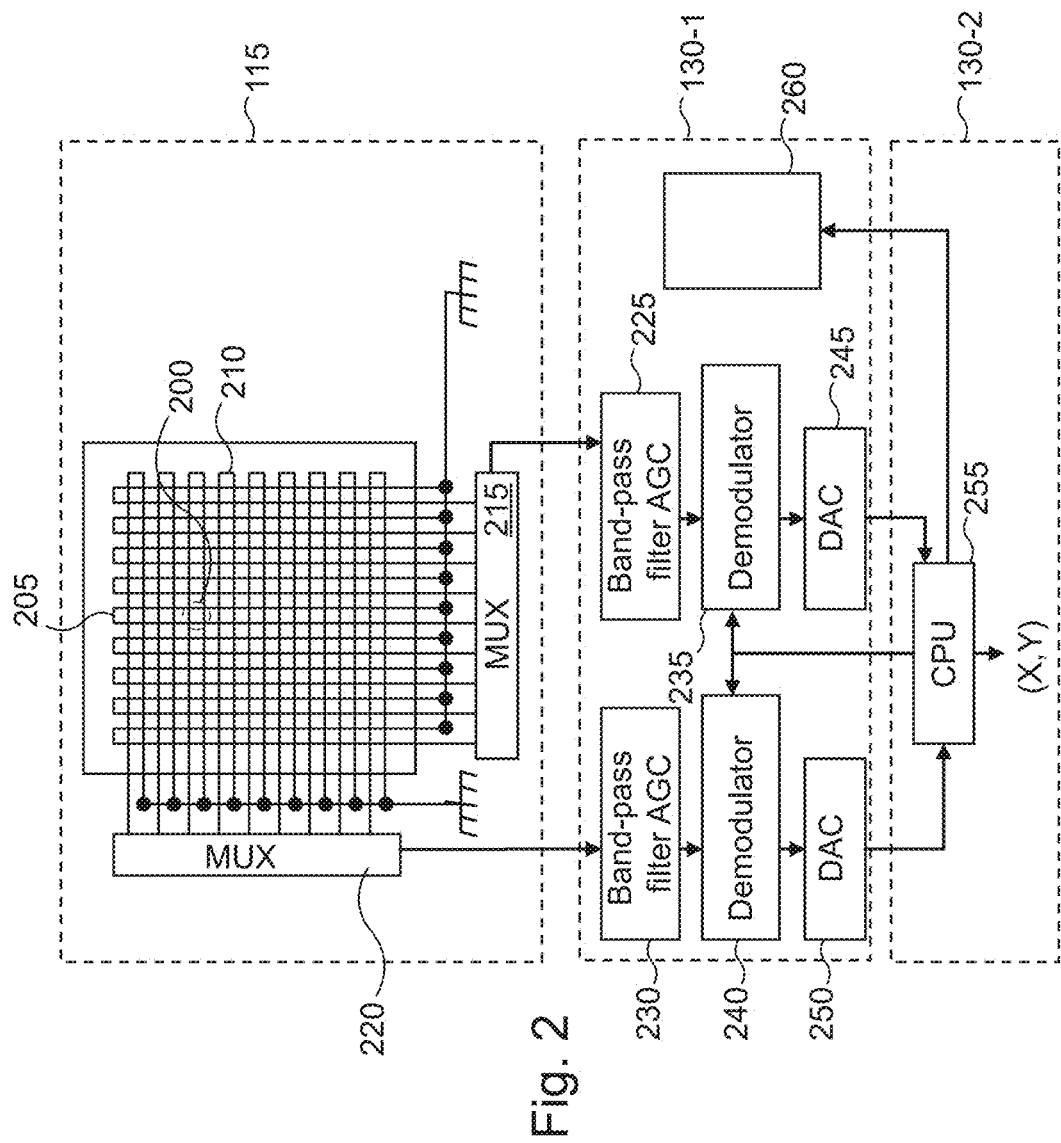

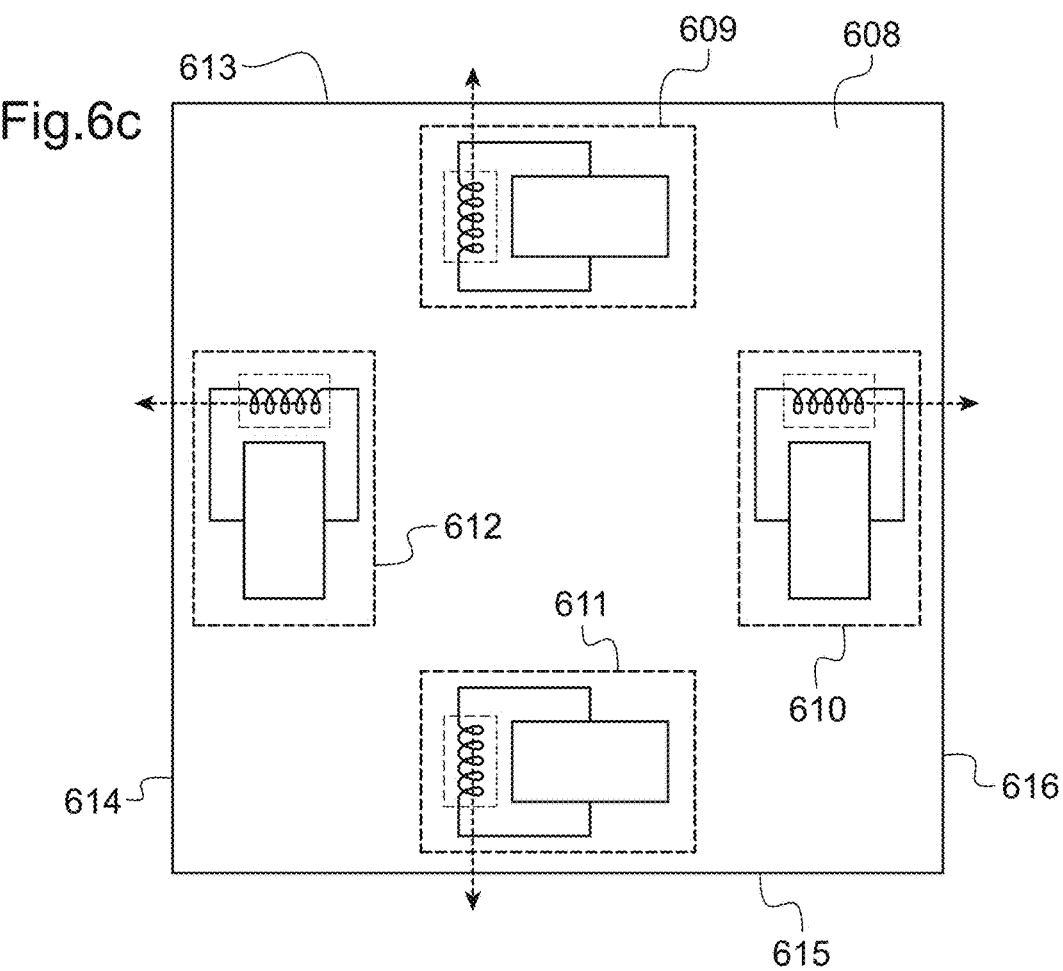
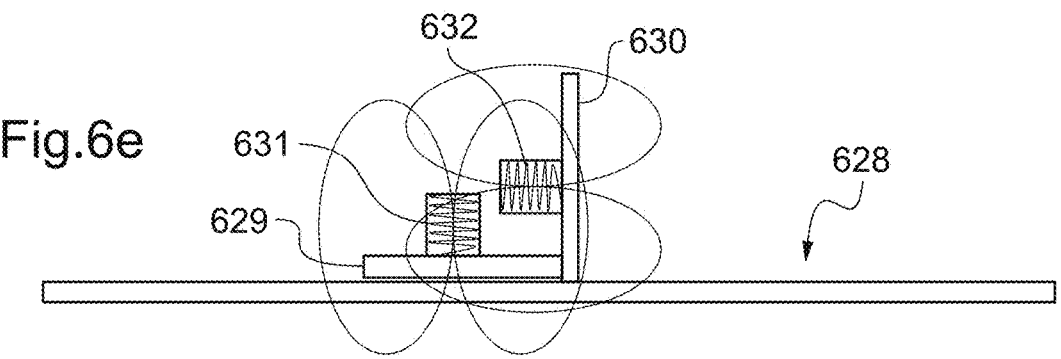
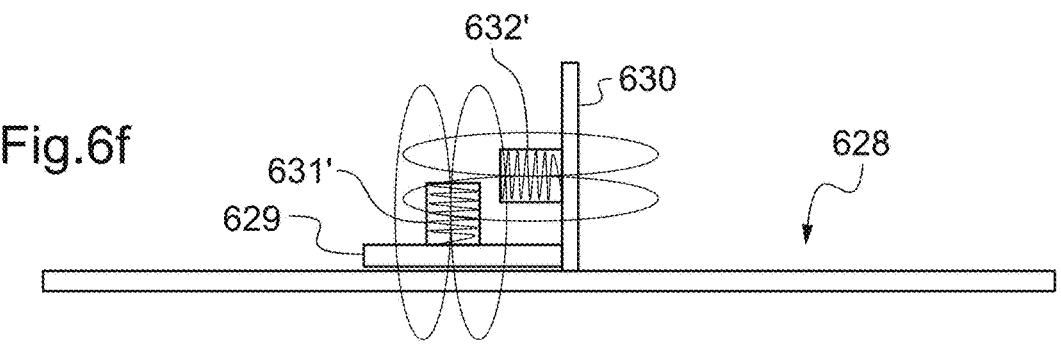

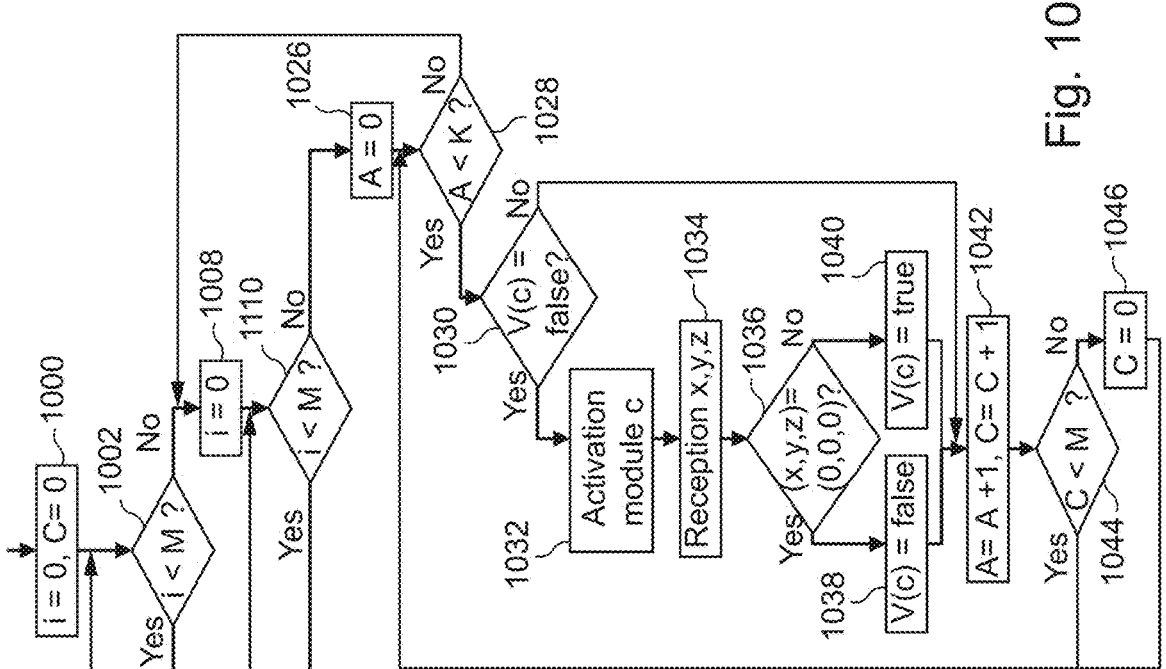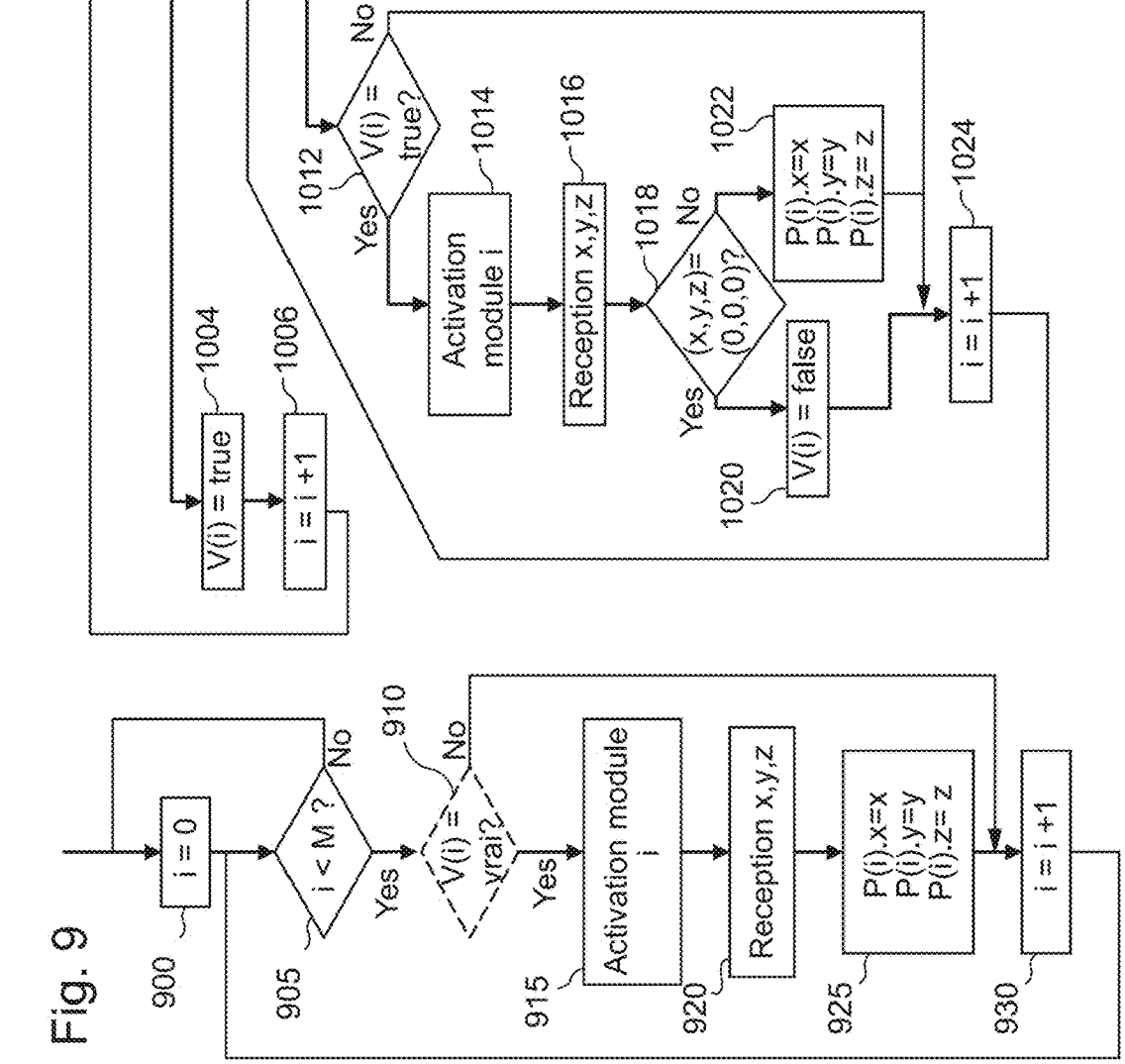

CONTROL OF A HOST STATION THROUGH MOVEMENT OF A MOVING DEVICE

BACKGROUND OF THE INVENTION

Field of the Invention

The present invention concerns the interfaces between a user and a computer system, in particular in the field of games, and more particularly a method and devices for interfacing a plurality of mobile devices with a computer system.

In numerous situations, it may be necessary, for a computer system, to detect the position and/or the orientation of mobile entities to enable the latter to react accordingly. Thus, for example, in a game of chess enabling a user to play against a virtual user simulated by the computer system, the application implemented on the computer system must know the position of all the pieces of the chess board, in particular those moved by the user, to compute its move.

Description of the Related Art

There are solutions for detecting the position and/or the orientation of real objects on a game board making it possible to use those objects as an interface for a computer system.

Thus, for example, resistive type touch screens may be used as a board game in order to detect the position of an object such as a stylus when sufficient pressure is applied. However, this type of screen in general only supports a single contact and requires constant pressure by the user to know the position. In other words, it is not possible to detect the position of the stylus if the pressure applied by the latter is relaxed.

It is also possible to use capacitive type touch screens, based on the principle of a leakage of current through a conductive body. However, only objects that are conductive and linked to a ground enable the detection of their position. Thus, for example, the positions of objects of plastic or wood cannot be determined using such screens.

Moreover, in general terms, the solutions based on touch screens or touch film, only support a limited number of simultaneous or almost simultaneous contacts and do not enable the determination of a high number of objects.

Other solutions implement technologies based on infrared, in particular in the form of tables. Thus, for example, the products known under the names Surface (Surface is a trademark of Microsoft), mTouch (mTouch is a trademark of Merel Technologies) and Entertaible (Entertaible is a trademark of Philips) use infrared cameras disposed within the thickness of the table. However, the required thickness of these tables makes them bulky and of low mobility and gives them a certain rigidity. Furthermore, their price does not really allow for family use.

Lastly, these solutions do not enable detection of the altitude, relative to a predetermined reference, of the mobile entities of which the movements and/or orientations are detected.

In document WO 2012/028827 a method has been provided to enable a computer system to simply and efficiently determine the position of a high number of mobile devices which may be used to interact with that computer system. A method of assisting location of mobile devices has also been described in French patent application FR 1255334.

BRIEF SUMMARY OF THE INVENTION

The present invention lies within this context.

The inventors have identified the possibility of using the detection of the position of one or more mobile devices relative to the host station to create a new type of interface with the computer system of the host station.

A first aspect of the invention concerns a method of controlling a host device for at least one mobile device comprising the following steps of:
  determining a current position of said at least one mobile device relative to an interacting surface of the host station by means of at least one electrical signal induced by at least one inductor magnetic field in at least one electrical circuit of the host device associated with said interacting surface,
  saving said current position in a position history, said position history comprising a set of positions of said at least one mobile device over a sliding temporal window,
  comparing, by means of said history, a change in the position of said at least one mobile device relative to the interacting surface of the host station with at least one reference movement diagram, said reference movement diagram being associated with at least one reference movement of the mobile device relative to the interacting surface of the host station, and
  triggering a command of the host station according to said reference movement, if said change corresponds to said reference movement.

A method according to the first aspect makes it possible to control a host device for mobile devices based on gestures made by a user manipulating a mobile entity.

The user is thus provided with an interface with the host device which is intuitive and of low complexity since it does not require any item dedicated to the interface (mouse, keyboard or other item) in addition to the mobile entities.

The determined position of the mobile entity may comprise at least one of:
  a distance between the mobile device and said interacting surface,
  a coordinate of the mobile device in a frame of reference associated with said interacting surface, and
  an orientation of the mobile device according to an axis orthogonal to said interacting surface.

All movements in space of the mobile entity relative to the host device may thus be used to define a command of the host device.

An absence of movement for a predetermined period may also be considered as a reference movement. Thus, for example, if the mobile device is left immobile for that predetermined period, an action associated with that immobility may be triggered.

The position history may for example be stored in a file, such as a temporary file, in random access memory or in lasting memory. The history may however be stored in other forms (data queue of FIFO type, FIFO standing for "First In First Out", an allocated memory, a database, etc.).

A method according to the first aspect may enable the use of the mobile entities as a user interface to be coupled with a display on a screen which may be either integrated into the host device or situated away from it.

Thus, for example, the method may furthermore comprise the following steps:
  displaying on a screen at least one contextual item for selecting said command, said at least one contextual item being displayed at a position on the screen representing the position of said mobile device relative to said interacting surface, selecting said contextual item according to a first identification of a first reference movement, and triggering said command according to a second identification of a second reference movement.

Said interacting surface may be superposed on said screen. The screen may also be situated away from the host station.

The detected movements may be of various kinds, thereby giving the user a variety of gestures to control the host device.

For example, the change in position of said mobile device comprises a fast variation in the distance between the mobile device and the interacting surface, and said reference movement is a click.

Said command may then comprise the activation of a selected action.

According to a further example, the change in the position of said mobile device comprises a succession of fast variations in the distance between the mobile device and a reference position in a frame of reference associated with said interacting surface, and said reference movement is a shake.

Said command may then comprise the cancellation of an action in course.

According to another example, the change in the position of said mobile device comprises a slow rectilinear movement of the mobile device relative to said interacting surface, and said reference movement is a slide.

Said command may then comprise the variation of a slider according to the movement of the mobile device.

According to another example, the change in the position of said mobile device comprises a rotation thereof relative to an axis orthogonal to said interacting surface, and said reference movement is a rotation of the mobile device between a first direction and a second direction.

said command may then comprise selecting a contextual item displayed on a screen and situated in said second direction.

According to embodiments, a prior step of receiving an activation signal generated by the mobile device further to the actuation of a user interface on the mobile device makes it possible to activate the determination of the current position of the mobile device.

Thus, the recognition of the reference movement which ensues is only carried out only at the user's request, which makes it possible to save computing resources within the host device.

A second aspect of the invention concerns a computer program as well as a computer program product and a storage medium for such program and product, enabling the implementation of a method according to the first aspect when the program is loaded into and executed by a processor, for example a processor of a host device of a mobile device.

A third aspect concerns a host device configured for implementing a method according to the first aspect.

For example, such a device comprises at least one interacting surface for interaction with at least one mobile device, said host device comprising a processing unit configured for the implementation of the steps of a method according to the first aspect.

A fourth aspect concerns a mobile device.

For example, such a mobile device comprises at least one location module to generate an inductor magnetic field configured to induce an electrical signal in at least one electrical circuit of a host device, said mobile device further comprising a user interface configured to trigger the sending, by the mobile device, of a command signal of the host device.

According to an embodiment, said signal is a signal for activating the determination by the host device, of the current position of the mobile device relative to an interacting surface of the host device.

This signal enables the user to trigger a reference movement recognition sequence. Such recognition on request enables computing resources of the host device to be served.

According to another embodiment, said interface comprises a plurality of successive positions, and said signal is a signal representing a current position of the interface.

The interface may thus be a slider or a wheel. This type of interface makes it possible to use graphical interfaces enabling the user to select values from a range of values or for instance items from a list.

According to still another embodiment, the device comprises at least two location modules, a first location module being installed in a main body of the mobile device, a second location module being installed in a secondary body of the mobile device, the secondary body being adapted to move relative to the main body.

With such an embodiment, the user may perform gestures of rotation of the secondary body relative to the main body, thus making a reference moment associated with a command.

A fifth aspect concerns a system comprising a host device according to the third aspect and at least one mobile device comprising at least one location module for generating an inductor magnetic field configured to induce an electrical signal in at least one electrical circuit of the host device.

For example, the system comprises at least one mobile device according to the fourth aspect.

BRIEF DESCRIPTION OF THE DRAWINGS

Other advantages, objects and features of the present invention will emerge from the following detailed description, given by way of non-limiting example, relative to the accompanying drawings in which:

FIG. 2 illustrates an example of a detection surface and of associated logic;

FIG. 5 illustrates a context for implementation of embodiments of the invention;

FIGS. 6a, 6b, 6c and 6d illustrate example embodiments of mobile devices;

FIGS. 6e and 6f illustrate the dimensioning of mobile devices;

FIGS. 9 and 10 illustrate examples of algorithms capable of being used to sequentially activate a set of location modules and to compute the positions and/or orientations of the corresponding mobile devices;

DETAILED DESCRIPTION OF THE PREFERRED EMBODIMENTS

Host Device

With reference to FIGS. 1 to 4, a description is given of a host device and mobile devices able to be used for embodiments of the invention.

Figure 1:
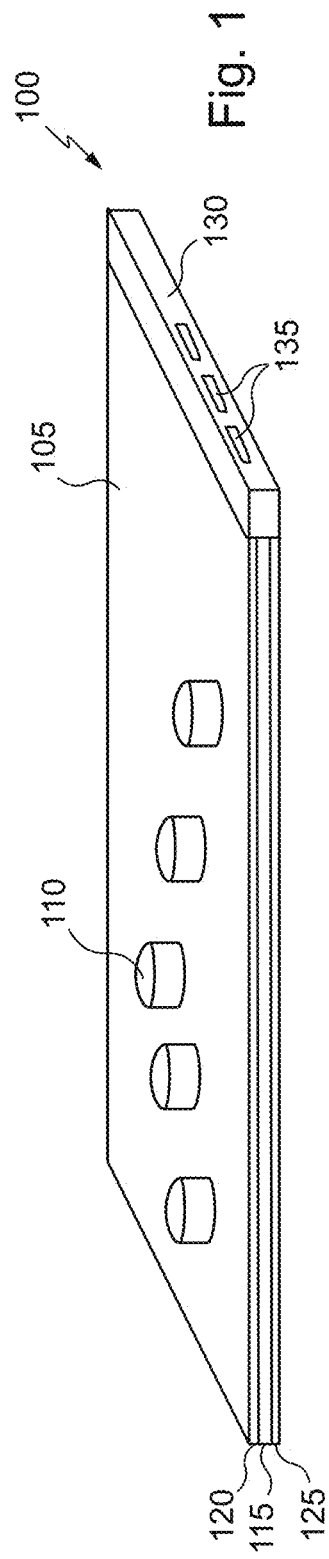
FIG. 1 diagrammatically illustrates an example of architecture capable of implementing the invention.

A general architecture 100 for implementation of embodiments is diagrammatically illustrated by FIG. 1. For example, this architecture is applied in the context of a game application. The invention is however not limited to such an application. Details on this type of architecture may be found in the document WO 2012/028827.

The architecture 100 comprises in a general manner a host device 105. The host device may for example take the form of a board. In the context of the game application, a game board may be adapted to couple the upper surface of the host device to a screen. This screen may for example enable information to be displayed for a user according to actions carried out by the user on the host device.

To interact with the host device, the user may use mobile devices 110 forming part of the architecture described here with reference to FIG. 1. In FIG. 1, five mobile devices are represented. However, the invention cannot be limited either to the number of mobile devices represented or to their form. For example, to interact with the host device, or more specifically with the associated computer system, the user may move the mobile devices.

To detect the interactions of the user, the host device comprises a detection layer 115 to detect the presence and/or the position and/or the orientation of the mobile devices relative to that layer.

For example, the detection layer is coupled to a screen 120 and a magnetic layer 125 (the detection layer 115, the screen 120 and the magnetic layer 125 are substantially parallel here). A detection module 130 of the host device makes it possible to detect the position and, if necessary, the orientation of the mobile devices as well as to implement one or more applications with which the user interacts.

The detection module is in particular in charge of managing the detections of the positions and/or orientations of the mobile devices. To that end, this module may for example identify location modules (not shown) disposed in the mobile devices. For example, the detection module identifies them one after the other then sends them an activation signal in order for them to emit, each in turn, an electromagnetic field. The detection module then employs an evaluation of their positions based on signals induced in the detection layer by the emitted magnetic fields.

The detection module is for example inserted into a casing with the other components of the host device 105. Alternatively, it may be a remote module integrated, for example, in a computer or game console. It may be electrically powered by a rechargeable battery or via a mains adaptor and have a set of conventional connections 135, for example an electrical plug for a mains adaptor, and ports for USB, Ethernet, VGA video (VGA standing for Video Graphics Array) and/or HDMI (HDMI standing for High Definition Multimedia In), where appropriate, in particular if a screen is associated with the detection layer. It may furthermore comprise a wireless communication module, for example a wireless communication module of WIFI or Bluetooth type enabling interaction with another computer system and/or access to data via a communication network.

The detection module 130 comprises a computing module and a control module for position sensing and detection detailed below. The computing module is provided here with a central processing module (or CPU), a graphics processing unit (or GPU), memory components (RAM, standing for Random Access Memory, ROM, standing for Read Only Memory and/or memory of Flash type) to store the programs and the variables necessary for the implementation of the invention as well as an audio processing module, in the form, for example, of a chipset.

According to a particular embodiment, the hardware module 130 is not integrated into the host device 105 but is linked to it. It is for example a device of smartphone type connected to the board 105.

The control module for position sensing and detection sequentially activates, for example by radio, each location module of which the position is to be determined or controls such a sequential activation.

After activation, each location module here emits an electromagnetic field sensed by the detection surface. Thus, a location module may also be seen as a magnetic field generating module. The generation of the magnetic field enables the host device to locate the mobile device.

Once the electromagnetic field has been sensed, the detection surface sends information to the position detection and sensing module making it possible to compute the position of a location module, for example of (x, y, z) type. As described below, when several location modules are associated with the same mobile device, it is possible, based on the positions of those location modules, to determine orientation parameters of that mobile device, for example in the form of angles. The positions and/or orientation of all the mobile devices of which the position and/or orientation are to be determined are then sent to the computing module which uses them to manage the interactivity with the application considered.

FIG. 2 illustrates an example of a detection layer and associated logic according to one embodiment.

The detection layer 115 comprises a mesh in the form of rows and columns constituting a conductive grid. The latter comprises a set of conductive loops along two orthogonal axes. Each loop is a discrete sensor enabling an induced signal to be measured, for example the magnitude of an induced current or the voltage induced by an electromagnetic field. The electromagnetic field is for example generated by a radiating element, such as a solenoid belonging to a mobile device of which the position and/or the orientation must be computed positioned in the vicinity of the upper surface of the host device, and more particularly in the vicinity of the detection layer.

By way of illustration, it is assumed here that a solenoid is placed in the vicinity of the position marked 200 in FIG. 2, at the intersection of the loops 205 and 210 of which one end is connected to a ground and the other end is connected to the electronic components used to compute a position. When the solenoid situated at position 200 is powered, it generates a magnetic field which induces electric currents in the loops 205 and 210 which may be analyzed and compared with the currents induced in the other loops. It is thus possible, by inductive coupling between the solenoid and the grid and by measurement of induced current, to determine the position of the solenoid relative to the conductive grid and thus relative to the detection layer.

Multiplexers 215 and 220 are connected to each loop of each of the two axes of the grid, that is to say here to each of the vertical and horizontal loops, respectively. The outputs from the multiplexers 215 and 220 are connected to the automatic gain controllers (AGCs) 225 and 230, respectively, of the control module for position sensing and detection, here referenced 130-1, of the detection module. The output signals from the automatic gain controllers 225 and 230 are first of all demodulated in the demodulators 235 and 240, respectively. The demodulation produces a direct current (or DC) signal proportional to the original sinusoid supplemented with alternating current (or AC) components that are multiples of the fixed frequency of the magnetic field emitted by the solenoid.

According to a commonly used configuration, the computing module, here referenced 130-2, of the detection module 130 controls the multiplexers 215 and 220 in order to sequentially activate the loops, that is to say to activate a loop n+1 after a loop n. When the last loop has been reached, the processor initiates a new cycle and controls the activation of the first loop.

A band-pass filter may be employed in each automatic gain controller 225 and 230 to eliminate the undesirable harmonics from the demodulated signal as well as the electromagnetic background noise. This filtering makes it possible to refine the measurements of the signals coming from the multiplexers 215 and 220, which are demodulated in the demodulators 235 and 240 then digitized in the digital/analog converters (DACs) 245 and 250, respectively.

The digital values obtained are sent to the central processing unit (CPU) 255 of the computing module 130-2 to be stored in memory. As illustrated, the central processing unit 255 controls the demodulators 235 and 240.

After the values have been stored in memory, the central processing unit increments the address of the multiplexers in order to carry out the digitization of the signals coming from the following loops. When a last loop has been attained, the central processing unit reinitializes the address of the multiplexer corresponding to the value of the first loop of the axis considered.

At the end of a cycle, the central processing unit has stored in memory, for each axis, the same number of digital values as there are adjacent loops close to the position of the solenoid. Based on these values, the central processing unit computes the position of the solenoid by interpolation as described below.

It is to be noted here that the ground connection of the loops may be provided by strips of metal positioned between the different loops in order to protect them from electromagnetic interference. An alternative consists of disposing a uniform ground plane under the conductive grid.

Furthermore, the control module for position sensing and detection 130-1 here comprises an emitter 260, controlled by the central processing unit 255 of the computing module 130-2, enabling a location module of a mobile device to be activated. By way of illustration, the central processing unit 255 sends to the emitter 260 an identifier of a location module to activate. This identifier is coded then sent in the form of a digital or analog radio signal. Each location module receiving this activation signal may then compare the identifier received with its own identifier and activate itself if the identifiers are identical. Alternatively, the central processing unit 255 sends to the emitter 260 a general activation command which is coded then sent in the form of a digital or analog radio signal.

The emitter 260 is linked to an antenna 265 enabling the sending of a command signal used by the mobile entities such as an energy source and for activating the location modules. The antenna 265 may be placed on the detection surface 115, for example around the loops 205 and 210. The loops 205 and 210 may be used to form the antenna 265. For such purposes, a switch is used to determine the sending or receiving function of the loops 205 and 210 (these latter are then, according to the position of the switch, linked to the multiplexers 215 and 220 or to the emitter 260).

As described below, the emitter 260 may in particular comprise a reader of RFID type.

Thus, to estimate the position of a set of location modules, each location module is sequentially activated and, for each of these activations, according to the embodiment described here, a cycle is carried out on each set of loops.

Several detection layers may be combined with each other in a same plane, the resulting area of the detection layer being the sum of the areas of the detection layers combined. For such purposes, one detection layer is considered as "master", the others being considered as slaves. The sequential activation of the mobile devices is managed by the "master" detection layer which preferably receives the positions computed by the detection modules associated with each slave detection layer and consolidates them by producing a table containing the coordinates and angles of freedom of the location modules.

Figure 3:
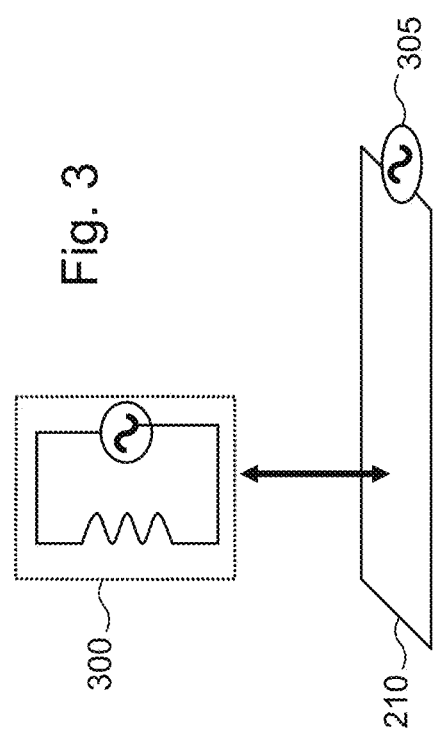
FIG. 3 diagrammatically illustrates the physical principle of inductive coupling between a solenoid and a conductive loop of a detection surface.

FIG. 3 diagrammatically illustrates the physical principle of inductive coupling between a solenoid and a conductive loop of a detection layer.

Each mobile device of which the position and/or the orientation are to be computed comprises at least one solenoid of which the axis is, preferably, oriented towards the detection surface.

The solenoid 300 is passed through by an alternating current and generates (or emits) an electromagnetic field which propagates towards the detection surface, in particular, in this example, towards the loop 210. The loop 210, receiving an electromagnetic field coming from the solenoid 300, couples with the solenoid 300. It is then possible to measure an alternating current signal at the terminals of that loop, referenced 305.

The coupling between the solenoid 300 and the loop 210 may be expressed in the form of the following relationship, $$R = \frac{k}{D^2} E$$

where

E designates the voltage at the terminals of the solenoid 300, R designates the voltage of the signal received at the terminals 305 of the receiving loop 210, D is the distance between the solenoid 300 and the receiving loop 210 and k is a constant linked to intrinsic factors of the system comprising the solenoid and the receiving loop, in particular the number of turns of the solenoid and the size of the loop.

Figure 4:
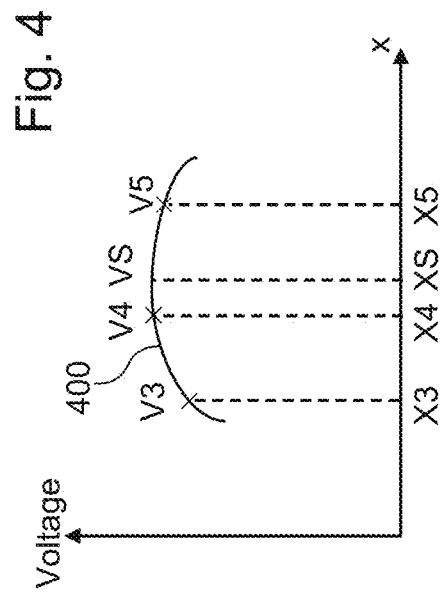
FIG. 4 diagrammatically illustrates an interpolation mechanism making it possible to compute the position of a solenoid placed on a detection surface, along a given axis, based on measurements obtained by a system such as that described with reference to FIG. 2.

FIG. 4 diagrammatically illustrates an interpolation mechanism making it possible to compute the position of a solenoid placed in the vicinity of a detection layer, along a given axis, based on measurements obtained by a system such as that described with reference to FIG. 2.

It is assumed here that the solenoid is situated in the vicinity of vertical loops B3, B4 and B5, positioned according to the x-coordinates X3, X4 and X5, the voltages measured at the terminals of the loops being denoted V3, V4 and V5, respectively. The solenoid is to be found here at a position, along the x-axis, denoted XS.

The coordinates X3, X4 and X5 may be obtained by the central processing unit from an identifier of the corresponding loop (these values are predefined according to the routing diagram of the detection surface and, preferably, are stored in a non-volatile memory).

The portion of curve 400 represented in FIG. 4 illustrates the variation in voltage for the position XS of the solenoid according to the positions of the loops coupled with the solenoid, extrapolated from the values measured by the loops B3, B4 and B5. It may be assimilated to a quadratic function of parabolic type. This local approximation corresponds, in practice, to the phenomenon of electromagnetic coupling between a solenoid and loops of a conductive grid.

The following relationships illustrate this property.

$$V3 = a(X3-XS)^2 + b$$

$$V4 = a(X4-XS)^2 + b$$

$$V5 = a(X5-XS)^2 + b$$

in which a and b are constants, a being a constant less than zero (a<0).

Furthermore, given the assumption of a quadratic function, the relationships between the x-coordinates X3, X4 and X5 may be expressed in the following form, $$X4-X3 = X5-X4 = \Delta X$$

$$X5-X3 = 2\Delta X$$

($\Delta X$ representing the distance between the x-coordinates X3 and X4 and between the x-coordinates X4 and X5).

It is thus possible to interpolate the position of the solenoid according to the following formula:

$$XS = X3 + \frac{\Delta X}{2} \frac{3V3 - 4V4 + V5}{V3 - 2V4 + V5}$$

It is also possible, according to the same logic, to determine the position of the solenoid according to the y-axis.

Furthermore, the distance between the solenoid and the loop (that is to say the altitude of the solenoid relative to the detection surface) may be defined according to the following relationship, $$D = \sqrt{\frac{k}{R}E}$$

The distance D is thus a function of the value R representing the voltage at the terminals of the loops considered of the detection surface. It may be extrapolated from the measurements made. It is to be noted that the accuracy of this distance computation is in particular linked to the stability of the signal E emitted by the solenoid of which the value must be as constant as possible over time, which requires a stabilized supply in the location module which must not drop as the battery discharges. This may be ensured by a voltage regulator of the location module.

As indicated earlier, the electronics for activating and locating the mobile entities is electrically supplied by induction. The antenna used to harvest the energy may also be used for activating and synchronizing the mobile entity. According to embodiments, the supply of the location modules of the mobile entities is made by a remote powering module of a circuit of RFID type. The utilization of an RFID type technology may thus be used to supply location modules and, the case arising, as communication means to enable them to be activated or synchronized.

For these purposes, the emitter 260 represented in FIG. 2 (or more generally the position detection controlling module) uses a reader of RFID reader type enabling an embodiment for communication and synchronization of the location module via the RFID technology. The communications may then be made by operations of reading and writing in a non-volatile memory of an RFID type circuit carried by the mobile entities. Such memories are for example accessible by the host device by RFID type accesses as well as by microcontrollers carried in the mobile entities by direct electrical links. A synchronization may in particular be made by a specific modulation of the amplitude of the RFID carrier.

Thus, for example, the electronics of the host device comprise an RFID type reader, that is to say a system enabling access through reading and writing to RFID type components, or RFID tags, situated in the vicinity of the host device. These electronics here comprise at least one conductive coil covering the whole of or part of the interacting surface of the host device, used as RFID emitter/receiver antenna.

The average magnetic power emitted by the RFID antenna of the host device is of a level such that it enables remote powering by magnetic induction of the electronics of the mobile entities situated in the immediate vicinity of the RFID antenna.

It is to be noted here that the RFID reader and the mobile entities may exploit one of the numerous RFID standards and their derivatives such as the standards ISO/IEC 15693, ISO 18000-3, ISO 18000-4, ISO 18000-7, ISO/IEC 14443, ISO/IEC 18092 (better known under the name of NFC, standing for Near Field Communication), ISO/IEC 21481 (also known under the name of NFC).

The central processing unit used to control the sensing surface, for example the central processing unit 255, is also used here to control the RFID reader. It may also temporally control the activation and the deactivation of the production of the electromagnetic field for remote powering in phase with a cycle of duration T1 of a common synchronization signal.

According to embodiments, at least some of the mobile entities contain a non-volatile dual-port memory. This latter is accessible here by an RFID type reader, via wireless communication, and also by a local microcontroller, via a wired connection, for example a connection in accordance with the I²C bus standard (I²C standing for Inter Integrated Circuit). Whereas this dual-port memory may be used to trigger the activation of a mobile entity and thus enable its location, it may also be used for other purposes while providing a particular communication means between a mobile entity and the sensing surface.

The dual-port memory of a mobile entity may be accessible through reading and writing by the RFID type reader of the host device. It forms a communication means between the logic of the host device and a microcontroller carried in a mobile entity. The microcontroller is, preferably, altered to each reading and writing request received via the wireless communication protocol. Further to the reception of an indication of reception of a request, the microcontroller may interrogate that memory to determine whether such a request is addressed to it, the access type (writing or reading access) and the memory address concerned by the access request.

Furthermore, each mobile entity contains, in non-volatile memory, a unique identifier which is stored, for example, over 64 bits. According to a particular embodiment, this unique identifier is that known under the name of UID (standing for Unique IDentifier) of an electronic component accessible using an RFID type reader. Such an identifier may in particular be in accordance with a standard such as the ISO 15693, ISO 18000-3 and ISO14443 standards. Thus, an RFID type reader makes it possible to detect the arrival of new mobile entities and to identify them in unique manner by their identifier.

As described below with reference to FIGS. 8a-8h, the logic associated with the host device may determine and allocate a time out value for each detected location module. A time out value here represents a period of time after which a location module must emit a location signal further to the detection of a synchronization signal. The time out value allocated to a newly detected location module may be a free time out value (previously allocated to a location module which is no longer detected).

For these purposes, the RFID type reader may address the determined time out value to a dual-port memory of a location module in a writing request. By way of illustration, a computer system associated with the host device may interrogate a database, local or remote, with the identifier of the location module as access key. Such a database for example makes it possible to obtain the list of the functional characteristics of the mobile entity. Thus, for example, this database may be used to determine whether the mobile entity comprising the location module considered has motors, actuators, display devices, sound production devices, sensors and/or switches. The list of the functionalities obtained may in particular be used to determine the nature of exchanges of commands and data that are possible between the computer system and the mobile entity.

The non-volatile dual-port memory used to store a location module identifier are, preferably, integrated with a remote powering module within the same component. Such components are available. Thus, for example, the company ST Micro Electronics manufactures a component under the reference M24LR16E which provides dual-port functions, of wireless interfacing and energy recovery.

In a mobile entity, such a circuit is advantageously linked to a microcontroller by an I2C type bus.

Furthermore, each mobile entity comprises one or more resonant circuits as well as at least one switch to enable the emission of location signals. The switch is for example controlled by the microcontroller which thus triggers the resonating or stopping of resonating enabling the location of the corresponding location module. It is to be noted here that the use of two resonant circuits enables a mobile entity to be located and to determine the orientation thereof. A single resonant circuit may be used if, alone, the position of the mobile entity is to be determined. Alternatively, more than two resonant circuits may be used, in particular to improve the estimation of the position and/or the orientation of the mobile entity.

Other embodiments may be envisioned for the logic associated with the detection layer. It is possible for example to refer to the document WO 2012/028827.

Context for Implementation

After having described the general architecture of a host device enabling the implementation of embodiments, a context of implementation of embodiments of the invention is described below.

FIG. 5 diagrammatically illustrates a host device 500 such as that already described in detail above.

A mobile device 501 is disposed on the upper surface (or host surface or interacting surface) 502, of the host device. This mobile device comprises two faces 503 and 504. The mobile device 501 is disposed on the host surface on the face 503, the latter is not thus visible in FIG. 5.

The mobile device 501 comprises two interacting surfaces which correspond to the faces 503 and 504. It is assumed that the user may interact with the host device, via the mobile device 501, by placing the latter on the host surface on one or other of its faces. According to the invention, the host device is then able to determine the face on which the mobile device is placed. In the illustrated example, the mobile device has the general shape of a disc. For example, the mobile device may represent a token which the user can place on one or other of its faces.

Another mobile device 505 is placed on the host surface. This mobile device has the general shape of a cube. It thus comprises six faces numbered "1" to "6". These faces constitute interacting surfaces for interaction with the host surface. In the example represented, the dice is placed on its face numbered "4" and only the faces numbered by "1", "3" and "5" are visible.

For example, the user implements on the host device an application, or a game, requiring the use of a die. The user may then throw the die on the host surface and, according to the face on which the die falls, the host device can deduce therefrom the number thrown. The host device detects the interacting surface in contact with the host surface and deduces the face of the die presented to the user. In such an application, the magnetic layer discussed in the presentation of the host device may be deactivated for the time in which to throw the die, or even be eliminated.

The mobile devices 501 and 504 described above have purely illustrate functions. The present invention is not to be limited to mobile devices having these shapes or having these functions.

Mobile Entities

FIGS. 6a, 6b, 6c and 6d diagrammatically illustrate respectively four examples of mobile devices according to embodiments. The invention is not limited to these examples. These examples may be combined.

Figure 6A:
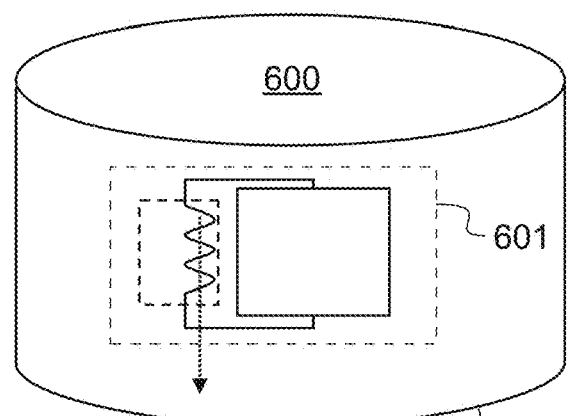

The mobile device 600 represented in FIG. 6a comprises a single location module 601. The mobile device has the general shape of a disc, for example to serve as a token. The mobile device could however have another shape.

As illustrated, the device comprises a solenoid of which the radial axis is perpendicular to the plane of the face 602 (or interacting surface) with which the detection module is associated. Thus, the electromagnetic radiation (represented by an arrow) of the solenoid propagates optimally towards that face.

The three-dimensional position of the mobile device 600 may be computed as described above. Based on the computed position of the solenoid of the location module 601 and knowing the position of that module in the mobile device 600, it is possible to deduce therefrom the position of the latter, that is to say the position of a point of reference of that mobile device relative to a detection layer of a host device. When several mobile devices are present on the detection surface, the position of each mobile device is determined sequentially.

Figure 6B:
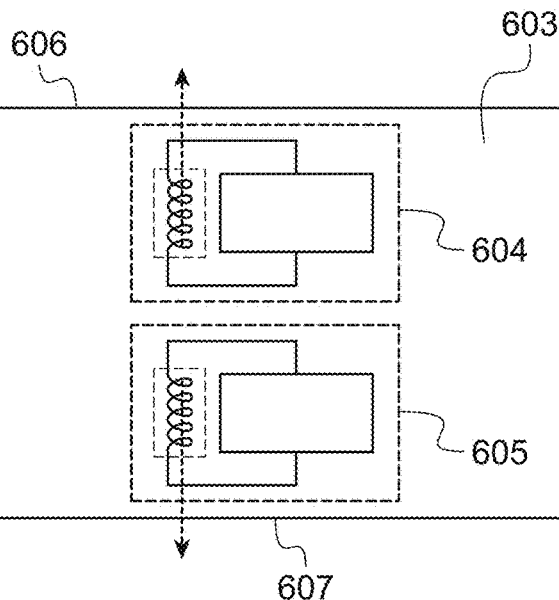

The mobile device 603 represented in FIG. 6b comprises two location modules 604 and 605. These location modules may be independent modules. By way of illustration, the mobile device has the general shape of a disc. In FIG. 6b, the circular faces 606 and 607 of the disc are not visible.

The radial axis of each solenoid of each location module is advantageously perpendicular to the plane of the face (or interacting surface) with which the location module is associated. Thus, the radial axis of the solenoid of the module 604 (respectively 605) is perpendicular to the face 606 (respectively 607). In this way, the electromagnetic radiation of the solenoids propagates optimally towards the faces of the mobile device.

The mobile device 608 represented in FIG. 6c comprises six location modules. These location modules may be independent modules. By way of illustration, the mobile device has the general shape of a cube. A location module is associated with each face of the mobile device. In FIG. 6c, the cube is seen from the front and only four location modules 609, 610, 611, 612 are represented. The mobile devices respectively associated with the front face and with the back face of the cube are not represented in the interest of clarity of the Figure.

The radial axis of each solenoid of each location module is advantageously perpendicular to the plane of the face (or interaction surface) with which the location module is associated. Thus, the radial axes of the solenoids of the modules 609, 610, 611 and 612 are respectively perpendicular to the faces 613, 614, 615 and 616. In this way, the electromagnetic radiation of the solenoids propagates optimally towards the faces of the mobile device.

Figure 6D:
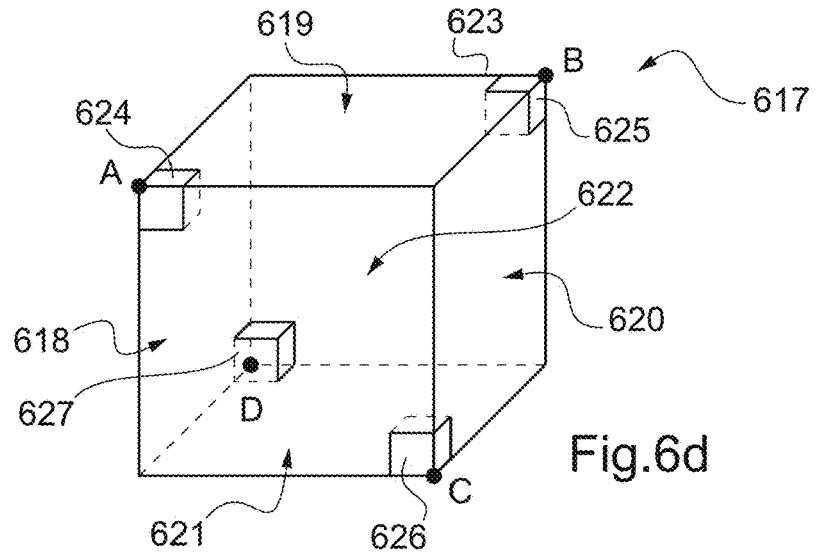

The mobile device 617 represented in FIG. 6d comprises four location modules. These location modules may be independent modules. For example, the location modules comprise solenoids. By way of illustration, the mobile device is substantially cube-shaped. It thus comprises six faces 618-623. The four location modules 624-627 are respectively disposed at the location of the four corners A, B, C and D of the cube.

According to the disposition of the location modules in the mobile entity represented here, it is the combination of the detection of at least two location modules at the detection layer of the host device which makes it possible to define the face of the mobile device which is in interaction with the host station.

When the location modules 624 and 626 (disposed at the corners A and C) are detected by the detection layer, the face 618 is defined as being that in interaction with the host station.

When the location modules 624 and 625 (disposed at the corners A and B) are detected by the detection layer, the face 619 is defined as being that in interaction with the host station.

When the location modules 626 and 625 (disposed at the corners C and B) are detected by the detection layer, the face 620 is defined as being that in interaction with the host station.

When the location modules 626 and 627 (disposed at the corners C and D) are detected by the detection layer, the face 621 is defined as being that in interaction with the host station.

When the location modules 624 and 627 (disposed at the corners A and D) are detected by the detection layer, the face 622 is defined as being that in interaction with the host station.

When the location modules 625 and 627 (disposed at the corners B and D) are detected by the detection layer, the face 623 is defined as being that in interaction with the host station.

With this disposition of the location modules, it is possible to reduce the complexity and the cost of manufacture of the mobile entity since a lower number of location modules is required.

Other forms of mobile devices as well as other dispositions of the location modules may be envisioned.

When the mobile device comprises a plurality of location modules, it may further comprise a processing unit (not shown) to control them. For example, this processing unit may receive from the host device an activation signal, then trigger a sequence for activation of the location modules.

When the mobile device is of reduced size and comprises several location modules with solenoids, the intensity of the radiated magnetic field must be determined such that two spatially close solenoids do not create perturbations for each other's location module.

FIG. 6e illustrates this problem diagrammatically. Two faces of a mobile device are represented in the vicinity of a detection layer 628 of a host device. The face 629 is placed on the detection layer whereas the face 630 is orthogonal to it. Solenoids 631 and 632 belonging to location modules are respectively associated with the faces 629 and 630. The lines of magnetic flux coming from the solenoids are represented.

The lines of flux coming from the solenoid 631 pass through the detection layer thereby inducing an electric current in the detection layer. The host device thus detects the presence of the face 618. However, on account of the proximity of the solenoid 632, the flux lines coming therefrom also pass through the detection layer. There is thus a risk of the host device detecting two interacting faces (or surfaces) in the same sequence for activation of the location modules. This risk exists in particular if the intensities of the magnetic fields generated are high.

To reduce this risk, account should be taken, in the dimensioning of the mobile device, of the overlap of the magnetic fields generated by the location modules that are close.

FIG. 6f illustrates one solution to this effect. This Figure reproduces the devices of FIG. 6e, with the exception of the solenoids 631 and 632 which are respectively replaced by solenoids 631' and '632'. The solenoids 631' and 632' have smaller dimensions and emit more "compact" lines of magnetic flux. Thus, as can be noted in FIG. 6f, the flux lines coming from the solenoid 632' do not pass through the detection layer. Only the flux lines coming from the solenoid 631' pass through that layer. The host device cannot thus detect both faces 629 and 630 in the same sequence.

The dimensions of the solenoid may thus be chosen in particular according to the dimensions of the faces with which they are associated so as to minimize the risk referred to above. Generally speaking, it should be ensured that the lines of flux coming from a solenoid do not pass through the detection layer (or do so only a little) when the face associated with it is not in interaction therewith.

For the mobile devices comprising a plurality of location modules, each location module may be activated independently from the others, sequentially. It is thus possible to determine the position of the mobile device by determining the position of each solenoid of the location modules and by knowing their respective position in the mobile device. Similarly, it is possible to know the orientation of this mobile device based on the relative positions of the solenoids of the location modules and their position in the mobile device.

It should be observed here that the use of the coordinates of the solenoids of the location modules, in the plane of the detection layer of the host device with which the mobile device interacts, makes it possible to determine the orientation of the mobile device relative to that plane whereas the use of the altitude of the solenoids of the location modules relative to that plane makes it possible to compute the pitch of the mobile device.

It is to be noted here that mobile devices comprising a single location module and comprising two location modules may be used conjointly on the same host device provided that the control module for position sensing and detection used is capable of activating each solenoid independently from the others.

The sensing of the orientation of mobile devices may thus be obtained by providing each mobile device with at least two location modules (which must not be aligned along a perpendicular to the plane of the detection layer) and by defining an identification rule for those location modules.

The roll of a mobile device may be determined by providing the latter with two complementary location modules (four location modules are then used) and by adding to the identification rule for those modules to associate identifiers of those four location modules with a mobile device.

Based on the three-dimensional positions of four location modules of a mobile device, it is possible to compute its six degrees of freedom.

It is also possible, by associating three location modules with a mobile device, forming an equilateral triangle, to approximately compute its six degrees of freedom.

The sequential activation of the location modules by a control module for position sensing and detection, makes it possible to estimate the position and/or the orientation of a plurality of mobile devices provided with those location modules.

When a location module receives an activation command dedicated to it, it triggers an electromagnetic emission. The detection system, knowing the identification of the location module in course of emission, can then link the computed position information to the identifier of the location module.

The control module for position sensing and detection is thus in charge of sequentially activating one electromagnetic emission per location module, of retrieving one by one all the positions and, knowing the links between the identifiers of the location modules and identifiers of the mobile devices, of computing orientations, where required, in order to associate positions and/or orientations with the identifiers of mobile devices. It thus constructs a table containing, for each mobile device, an identifier, an x-coordinate, a y-coordinate and, preferably, an altitude in a frame of reference of the detection surface as well as, where required, values for yaw, pitch and roll.

The sequential activation of the electromagnetic emission of the detection modules enables the use of a single emission frequency for all the mobile devices managed by the system. Different algorithms for activation may be used by the control module for position sensing and detection. It is thus possible to always activate all the location modules, to activate a subset of location modules, that subset being, for example, defined by programming via the computing module (such an implementation makes it possible in particular to reduce the overall duration of the full activation sequence of the parts) or to activate the location modules according to the context. This last solution in particular makes it possible to manage the fact that certain mobile devices may leave the detection surface and that their positions and/or orientation is no longer required to be computed. A secondary loop may however preferably enable surveillance of their possible reintegration onto the detection surface and the ensuing need to again sense their position and/or orientation. This embodiment makes it possible to optimize the overall duration of the sequence for activation of all the location modules to be activated.

Figure 7A:
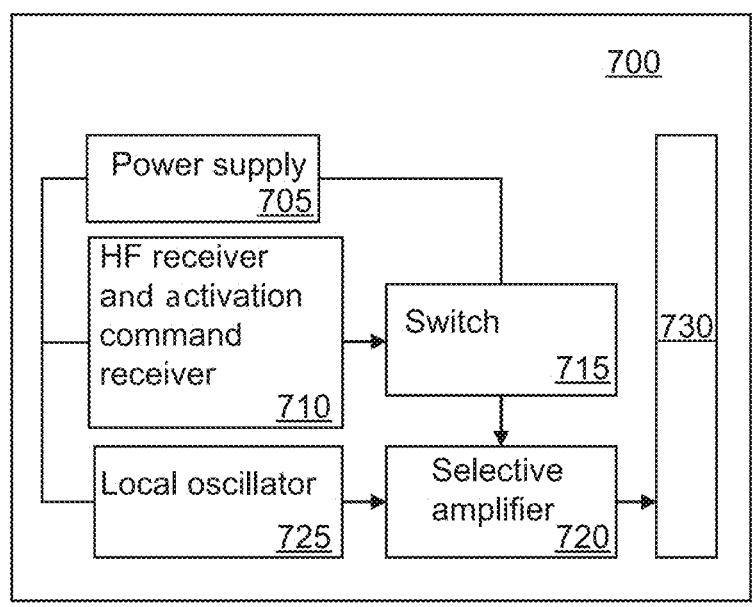
FIG. 7a diagrammatically illustrates logic blocks of a location module for locating a mobile device of which the position and/or the orientation may be determined from a host device.

The general architecture of a mobile device is described with reference to FIG. 7a. A mobile device comprises a location module of which the logic blocks are represented diagrammatically. The location module makes it possible to determine, based on a system such as that described above, the position and/or the orientation of the mobile device.

The location of the mobile device is carried out by means of the generation of an electromagnetic field.

Such a mobile device is, preferably, autonomous both as regards its electrical supply and as regards the reception of signals for controlling electromagnetic emission.

The location module 700 thus comprises an electrical supply module 705 providing a voltage for all the components of the location module as well as a command reception and detection module 710 which receives and demodulates a signal, for example a HF signal, emitted by an external module for controlling position sensing and detection to determine whether the signal received concerns the activation of that location module. As described above, such a detection may be carried out by the comparison of a received identifier with an identifier stored in memory in advance.

The location module 700 further comprises a switch 715, controlled by the command reception and detection module 710, as well as a selective amplifier 720 controlled by the switch 715. Lastly, the location module 700 comprises a local oscillator 725 generating a frequency, which is preferably fixed, stable and of square-wave type, and a solenoid 730.

The selective amplifier 720 generates, according to the position of the switch 715 and based on the signal from the local oscillator 725, a sinusoid voltage at the terminals of the solenoid 730, enabling the solenoid 730 to generate sufficient radiation power.

Several types of electrical supply for the location module may be used. The supply may be obtained from a rechargeable battery and a standard control circuit. It may also be obtained from a battery and a voltage regulator making it possible to obtain a constant voltage throughout a range of use of the battery. This solution is particularly advantageous when the system must compute the altitude of mobile devices utilized.

The supply may also be provided indirectly, by remote powering. According to this embodiment, a layer of dedicated radiating solenoids is placed under the detection surface. These solenoids are passed through by a sinusoid signal and the power emitted by each solenoid is sufficient to remotely power the location modules positioned above it. The location modules are also equipped with a solenoid for receiving, by induction, the signal emitted by the solenoids present under the detection surface.

The remote powering may also be coupled with the use of a high capacity capacitor which is charged from the solenoid of the location module. The capacitor is then used as a voltage source to supply the other modules. Alternatively, the remote powering may be coupled with the use of a battery present in the mobile device, for example a lithium battery. The solenoid of the location module then continually recharges that battery as soon as an induced current passes through it. A charge/discharge protection circuit is advantageously associated with the battery in order for it to remain within its range of acceptable voltages. As indicated earlier, if the altitude of mobile devices is to be evaluated, the voltage source is, preferably, regulated in order for the supply voltage to be constant for a duration of use of that voltage source, that is to say for an estimation of position and/or orientation of the mobile device.

The mobile devices situated on a detection surface and used conjointly may use different types of power supply.

Furthermore, when a mobile device comprises more than one location module, certain components, in particular the electrical supply, may be common to some or all of the location modules.

Figure 7B:
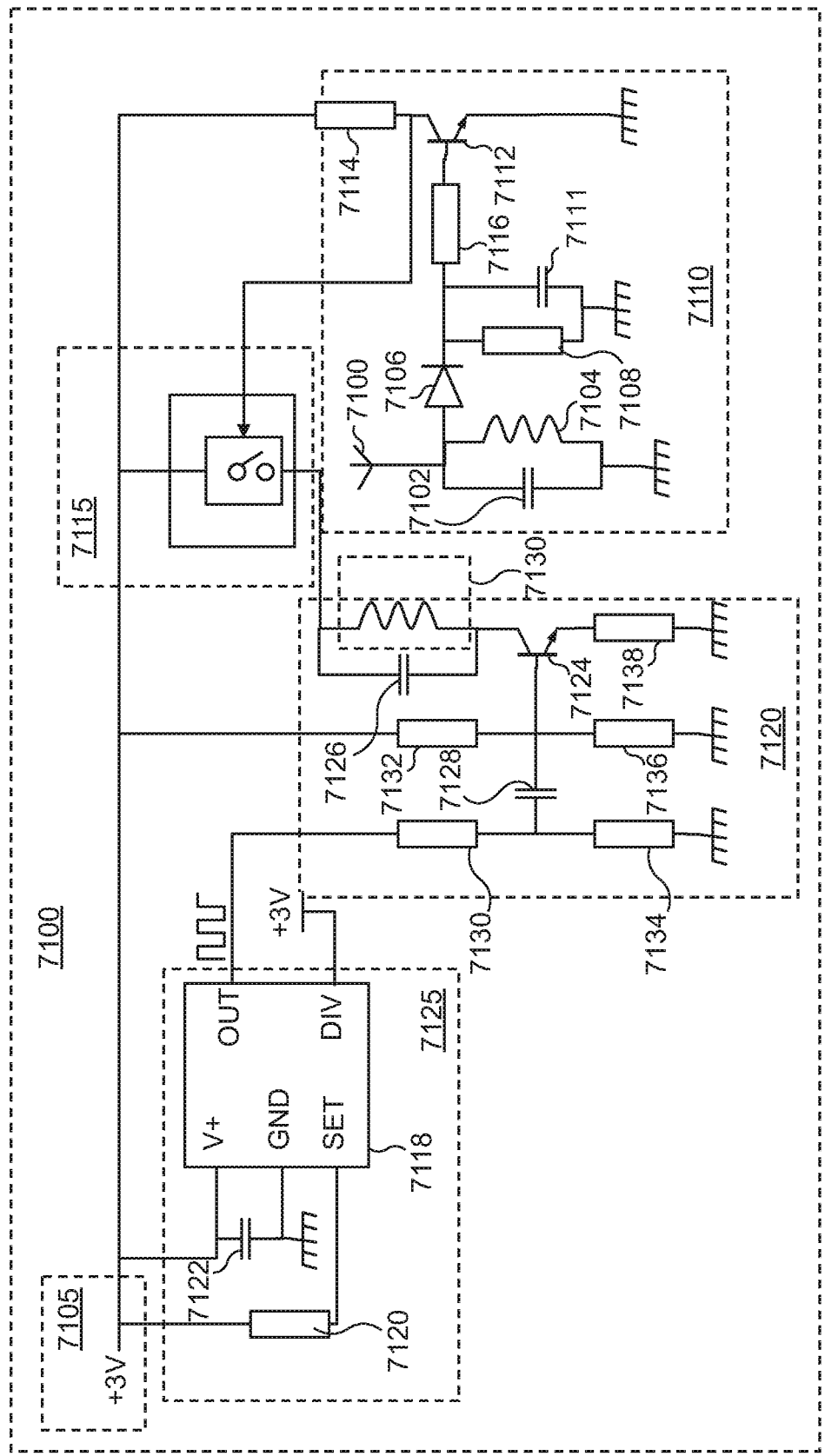
FIG. 7b illustrates an example of electronic implementation of the logic diagram described with reference to FIG. 7a relative to a location module for locating a mobile device of which the position and/or the orientation may be determined.

FIG. 7b illustrates an example of electronic implementation of the logic diagram described with reference to FIG. 7a relative to a location module for locating a mobile device of which the position and/or the orientation may be determined.

The circuit diagram illustrated in FIG. 7b concerns an analog embodiment with transmission of N carriers by the control module for position sensing and detection, N representing the maximum number of location modules for which the positions can be computed by the system.

The command detection and reception module 7110 is here directed to detecting the frequency of the carrier associated with the location module considered. It comprises, in this example of implementation, a reception antenna 7100 and a network LC, comprising a capacitance 7102 and an inductance 7104, tuned to an emission frequency of the control module for position sensing and detection. It also comprises a diode 7106 having the task of eliminating the negative component of the signal as well as a low-pass RC filter, comprising a resistor 7108 and a capacitor 7111, having the task of eliminating the carrier. If the carrier is present, a signal is output from the filter whereas if the carrier does not correspond to the location module considered, the signal is zero at the output from the filter. The command reception and detection module 7110 further comprises a switching transistor 7112, actuating the switch 7115 via a resistor 7114 which enables the selective amplifier 7120 to be activated. The switching transistor 7112 is here linked to the RC circuit via a resistor 7116.

Such an implementation is directed to activation signal reception according to amplitude modulation. However, other embodiments such as reception with frequency modulation or reception with phase modulation may be employed.

The switch used is, for example, an HC 4066 switch from the company Texas Instruments. It makes it possible to activate or deactivate the selective amplifier. The activation is carried out when the switch is open, that is to say when the selective amplifier is connected to the power supply 7105.

As described above, the local oscillator 7125 generates, preferably, a square-wave signal of which the frequency is compatible with the conductive loops of the detection surface (these loops being dimensioned to receive a specific frequency). It comprises an oscillator 7118 here, for example an LTC 1799 oscillator from the company Linear Technology, coupled to the resistor 7120 here having a value of 4 kOhms to define an oscillation frequency of 250 KHz compatible with the frequency detected by the loops of the detection surface.

The selective amplifier 7120 makes it possible to convert the square wave signal generated by the local oscillator 7125 into a sine wave signal. It furthermore ensures an optimum gain for the frequency of the local oscillator and enables the required magnitude of the sine wave signal passing through the solenoid 7130 and thus the optimum electromagnetic radiation towards the detection surface used.

The selective amplifier is produced here from a switching transistor 7124, capacitors 7126 and 7128 as well as from the network of resistors 7130 to 7138. The value of the capacitor 7128 is for example 33 µF whereas the value of the resistor 7130 is 2 kOhms, the resistors 7132, 7134, 7136 and 7138 1 kOhm and the resistor 7138 100 kOhms. Thus, the times for establishing and cutting-off the selective amplifier 720 are the shortest possible.

The command detection and reception module 7110 may be embodied according to variants other than that described above. In particular, beyond the analog embodiment with transmission of N carriers by the control module for position sensing and detection, it is possible to implement an analog embodiment using a single carrier containing a signal useful for the activation of a location module. According to this variant, a useful signal of which the frequency must be detected to activate or not activate a location module is available at the output of the low-pass RC filter. This signal may, for example, be filtered in a band-pass filter of which the resonant frequency is tuned to the specific activation frequency of the location module considered. The output of this band-pass filter is then sent to a switching transistor which activates the analog switch enabling the activation of the selective amplifier.

Alternatively, a digital embodiment with transmission of a single carrier containing a digital useful signal for the activation of a location module may be used. According to this variant, a useful signal is available at the output from the low-pass RC filter. This signal is typically a square wave signal containing digital information coded over several bits enabling the activation of a plurality of location modules. Each location module is equipped with a microcontroller which decodes that signal and, according to the encoded value and a predetermined value, activates the analog switch and thus the selective amplifier.

Other communication protocols such as Wi-Fi, ZigBee or Bluetooth may be used to send an activation command.

The pair formed by a local oscillator and a selective amplifier procures certain advantages. In particular, as the local oscillator is always active, it is not necessary to activate and deactivate it. Furthermore, the selective amplifier used is the device which operates by switching (it is powered or not according to the position of the analog switch). Such an implementation thus enables a very short activation and deactivation time for the selective amplifier and makes it possible to optimize the switching time and thus the overall cycle time (one cycle corresponding to the activation/deactivation of all the location modules).

It is however possible to implement simpler variants of oscillators able to replace the local oscillator and selective amplifier pair, typically an assembly known as a Clapp or Colpitts type arrangement.

Below, variants are described in which the mobile entities are remotely powered, as already referred to in more detail in the description.

Figure 8A:
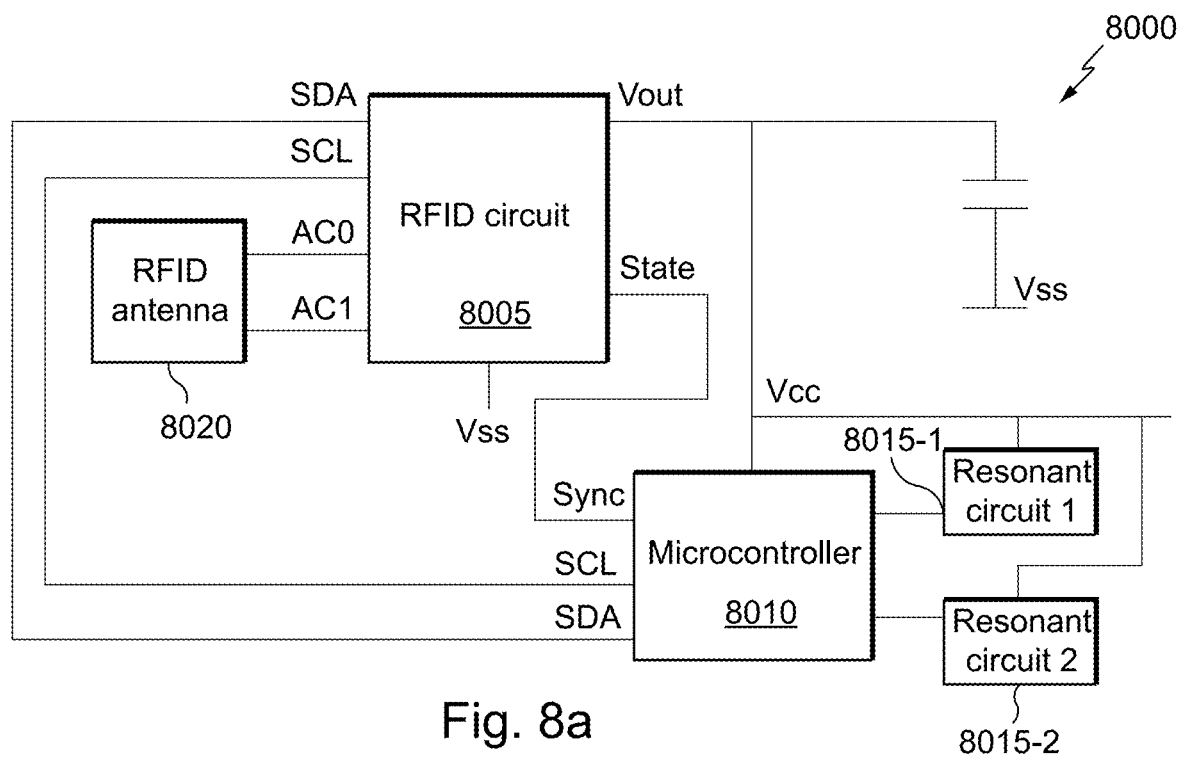
FIGS. 8a-8h illustrate embodiments of mobile device location modules.

FIG. 8a illustrates a first variant embodiment of an electronic circuit 8000 of a mobile entity. As illustrated, the circuit 8000 comprises a standard component 8005 providing functions of RFID type by integrating a dual-port memory called an RFID chip, a microcontroller 8010 and two resonant circuits 8015-1 and 8015-2, generically referenced 8015. The circuit 8000 also comprises an antenna 8020 of RFID type adapted to the characteristics of the circuit 8005. The antenna 8020 is typically a coil linked to the circuit 8005 via two links called AC0 and AC1 (AC standing for antenna coil).

Two resonant circuits are implemented, sequentially, to enable the position and orientation of the mobile entity to be determined. In other words, the mobile entity here comprises two location modules, these location modules having a part in common (basically comprising the RFID circuit, the RFID antenna and the microcontroller) and distinct parts (basically comprising the resonant circuits).

The RFID circuit 8005 is connected here to the microcontroller 8010 by a bus of I2C type comprising a serial link for a clock signal called SCL (for Serial CLock) and a serial link to send data called SDA (for Serial Data). The electrical supply terminal of microcontroller 8010, here denoted Vcc, like that of the resonant circuits 8015-1 and 8015-2, is connected to the terminal of the RFID circuit 8005 delivering a voltage, here denoted Vout. In a conventional manner, the terminal of the RFID circuit 8005 delivering a voltage is linked to a reference terminal denoted Vss by a capacitor enabling electrical peaks to be absorbed.

Furthermore, the synchronization signal of the microcontroller, used to control the triggering or stopping of the resonance (enabling the location of the mobile entity) is connected to a state terminal of the RFID circuit, denoted state here.

As the RFID circuit 8005 is linked to the RFID antenna 8020, it can receive electrical energy from an RFID reader and exchange data with the reader, according to reading and writing requests, in particular to update its memory. As the output Vout of the RFID circuit 8005 is linked to the supply terminals Vcc of the microcontroller 8010 and of the resonant circuits 8015-1 and 8015-2, these circuits may be electrically supplied and used.

According to one example, the state terminal of the RFID circuit 8005 indicates, by a first logic state, for example the value 1, that the RFID circuit is receiving and processing a reading or writing request, or, more generally, that it is performing a predetermined task. In the opposite case, the state terminal of the RFID circuit 8005 is in a second logic state, for example the value 0. Thus, on account of the connection of the synchronization terminal of the microcontroller 8010 to the state terminal of the RFID circuit 8005, one of the resonant circuits 8015-1 or 8015-2 may be activated by the microcontroller 8010, immediately or on a differed basis, according to a state of the RFID circuit 8005. In other words, a resonance and thus an electromagnetic emission is triggered (after a predetermined time which may be zero) when the state terminal of the RFID circuit 8005 is in the first logic state and stopped (also after a predetermined time which may be zero) when the state terminal of the RFID circuit 8005 is in the second logic state. In other words, the RFID circuit 8005 has the task of controlling the triggering or the stopping of the resonance (enabling the location of the mobile entity).

It is to be noted here that the activation of the resonant circuits may, for example, be carried out sequentially according to a predetermined time offset (one of the resonant circuits may be activated after a first predetermined delay following the synchronization signal and the other resonant circuit may be activated after a second predetermined delay after the synchronization signal.

Figure 8B:
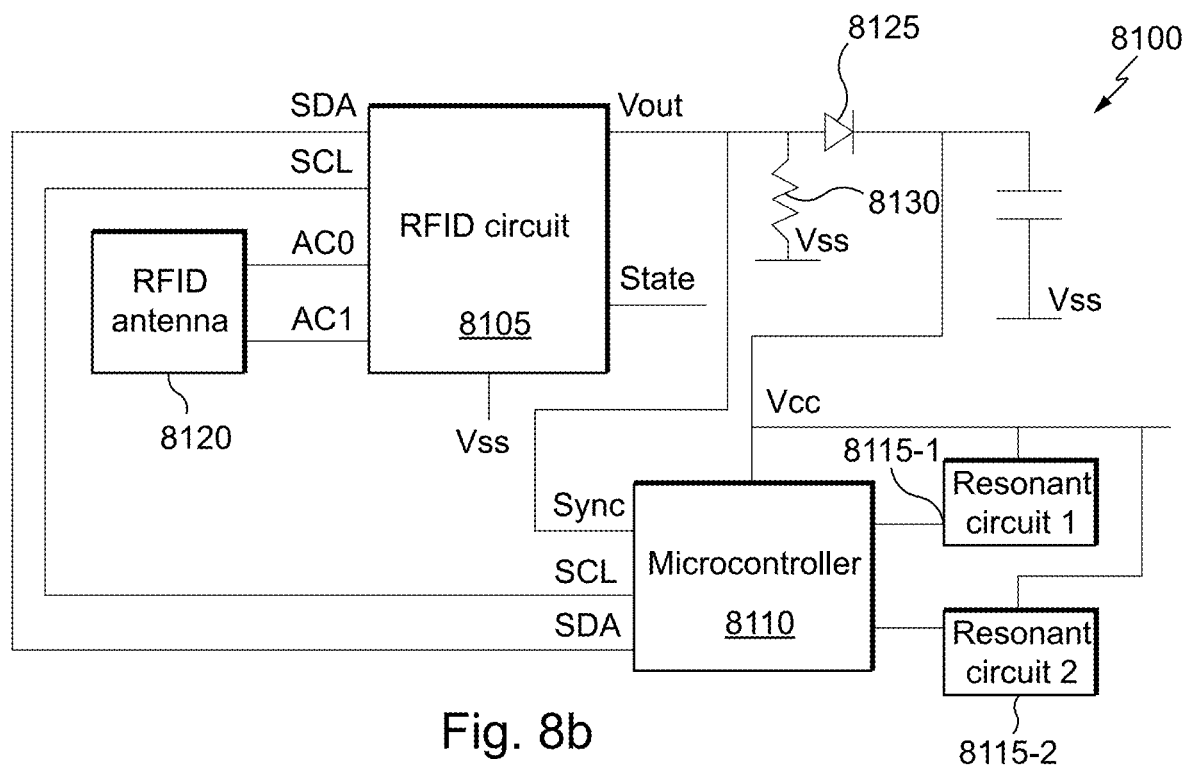

FIG. 8b illustrates a second variant of an electronic circuit 8100 of a mobile entity. Like the circuit 8000, the circuit 8100 comprises a standard component 8105 providing functions of RFID type and integrating a dual-port memory (RFID component), a microcontroller 8110 and two resonant circuits 8115-1 and 8115-2, generically referenced 8115. The circuit 600 further comprises an antenna 8120 of RFID type adapted to the characteristics of the circuit 8105. Again, the antenna 8120 is typically a coil linked to the circuit 8105 via the two links AC0 and AC1.

Like for the circuit 8000, the RFID circuit 8105 is connected here to the microcontroller 8010 by a bus of I2C type comprising the links SCL and SDA and the electrical supply terminal Vcc of the microcontroller 8110, like that of the resonant circuits 8115-1 and 8115-2, is connected to the Vout terminal of the RFID circuit 8105 delivering a voltage.

However, contrary to the circuit 8000, the synchronization signal of the microcontroller, used to control the triggering or stopping of the resonance (enabling the location of the mobile entity) is connected here to the Vout terminal of the RFID circuit 8105 delivering a voltage.

Moreover, the electrical supply terminal Vcc of the microcontroller 8110, like that of the resonant circuits 8115-1 and 8115-2, is connected to the terminal Vout of the RFID circuit 8105 delivering a voltage via a diode 8125. Furthermore, a resistor 8130, for example a resistor of one mega ohm (1 MΩ) links the terminal Vout of the RFID circuit 8105 to a reference terminal Vss.

Again, the RFID circuit 8105 is linked to the RFID antenna 8120 which enables it to receive electrical energy from the RFID reader and to dialog in reading/writing with the RFID reader to update its memory. Furthermore, as the output Vout of the RFID circuit 8105 is linked to the supply Vcc of the microcontroller 8110 and of the resonant circuits 8115-1 and 615-2, these three circuits are electrically supplied by the RFID circuit 8105.

The synchronization of the microcontroller 8110 is carried out here by the output Vout of the RFID circuit 8105. Thus, when the RFID reader provides energy to the mobile entity 8100, the output Vout from the RFID circuit 8105 provides a control voltage which is to be found at the input Sync of the microcontroller 8110. This control voltage represents a first logic state. Conversely, when the output Vout passes to high impedance when the RFID reader no longer supplies energy to the mobile entity 8100, the input state Sync of the microcontroller 8110 passes to 0 Volts thanks to the resistor for pull-down to ground and thanks to the diode 8130 which prevents the return of current, representing a second logic state. The first and second logic states enable the synchronization of the microcontroller 8110.

According to this embodiment, it is the software application running on the RFID reader that has the task of generating a remote powering signal and of activating that signal when it is desired to synchronize the microcontrollers of the mobile entities.

Figure 8C:
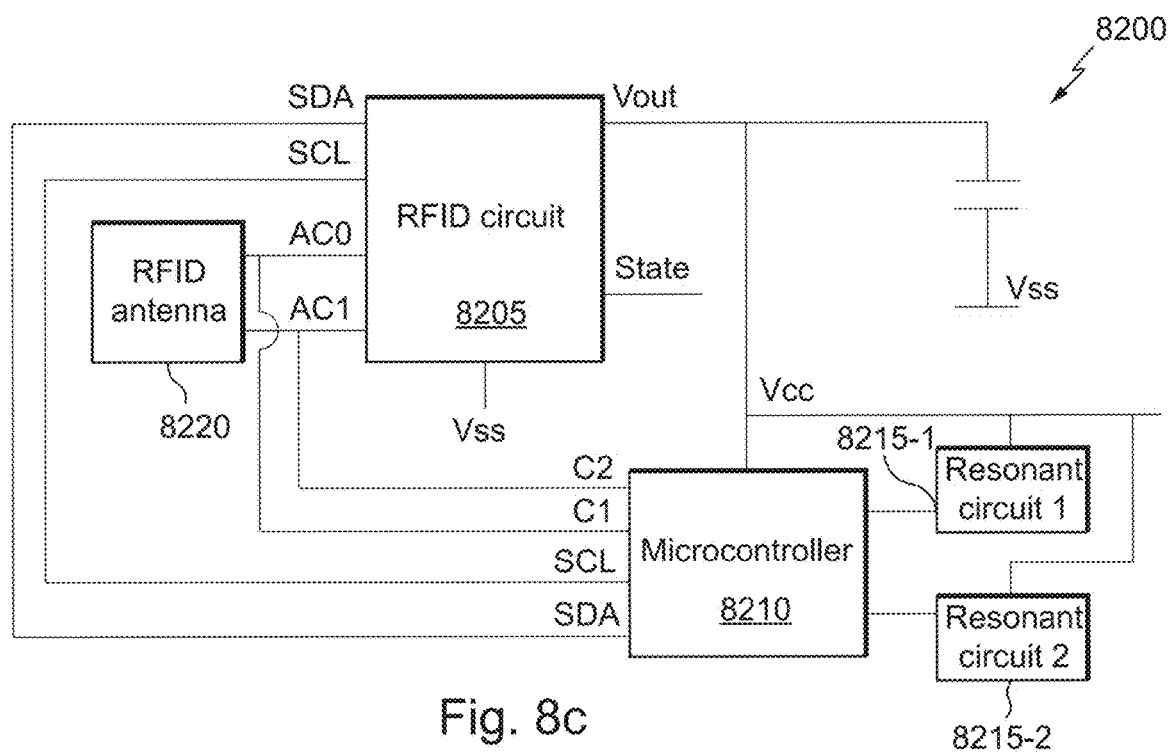

FIG. 8c illustrates a third variant of an electronic circuit 8200 of a mobile entity. Like the circuit 8000, the circuit 8200 comprises a standard component 8205 providing functions of RFID type and integrating a dual-port memory (RFID component), a microcontroller 8210 and two resonant circuits 8215-1 and 8215-2, generically referenced 8215. The circuit 8200 further comprises an antenna 8220 of RFID type adapted to the characteristics of the circuit 8205.

Again, the antenna 8220 is typically a coil linked to the circuit 8205 via the two links AC0 and AC1.

Like for the circuit 8000, the RFID circuit 8205 is connected here to the microcontroller 8210 by a bus of I2C type comprising the links SCL and SDA and the electrical supply terminal Vcc of the microcontroller 8210, like that of the resonant circuits 8215-1 and 8215-2, is connected to the Vout terminal of the RFID circuit 8205 delivering a voltage.

However, contrary to the circuit 8000, the synchronization signal of the microcontroller 8210 is not used. To be precise, the synchronization is carried out here based on the result of an analog comparator of the microcontroller 8210, of which the terminals are denoted C1 and C2. As illustrated, these terminals are connected, respectively, to the terminals AC0 and AC1 of the RFID antenna 8220. Therefore, the control of the triggering or stopping of the resonance (enabling the location of the mobile entity), is directly linked to the RFID antenna 8220 here.

Again, the RFID circuit 8205 is linked to the RFID antenna 8220 which enables it to receive electrical energy from the RFID reader and to dialog in reading/writing with the RFID reader to update its memory. Furthermore, as the output Vout of the RFID circuit 8205 is linked to the supply Vcc of the microcontroller 8210 and of the resonant circuits 8215-1 and 8215-2, these three circuits are electrically supplied by the RFID circuit 8205.

The analog comparator of the microcontroller 8210, linked to the terminals C1 and C2, is configured in counting mode (sensing mode). This makes it possible to obtain a count of the number of oscillations output from the RFID antenna 8220. Thus, a frequency equal to the frequency of the carrier emitted by the RFID reader may be detected at the output of the analog comparator when the latter emits a carrier, for example a frequency equal to 15 MHz. If, on the contrary, the RFID reader emits no carrier, no frequency is detected at the output of the analog comparator (or a frequency distinct from that of the carrier). In other words, the synchronization of the microcontroller 8205 is carried out via the detection or not of the RFID reader carrier. The software application running on the RFID reader thus has the task of generating the carrier or not, for example a carrier having a frequency equal to 15 MHz, synchronously with the activation frequency of the mobile entities.

It is observed here that to stop an RFID carrier practically instantaneously, its resonant circuit is cut at the instant the current passing through it is zero.

Figure 8D:
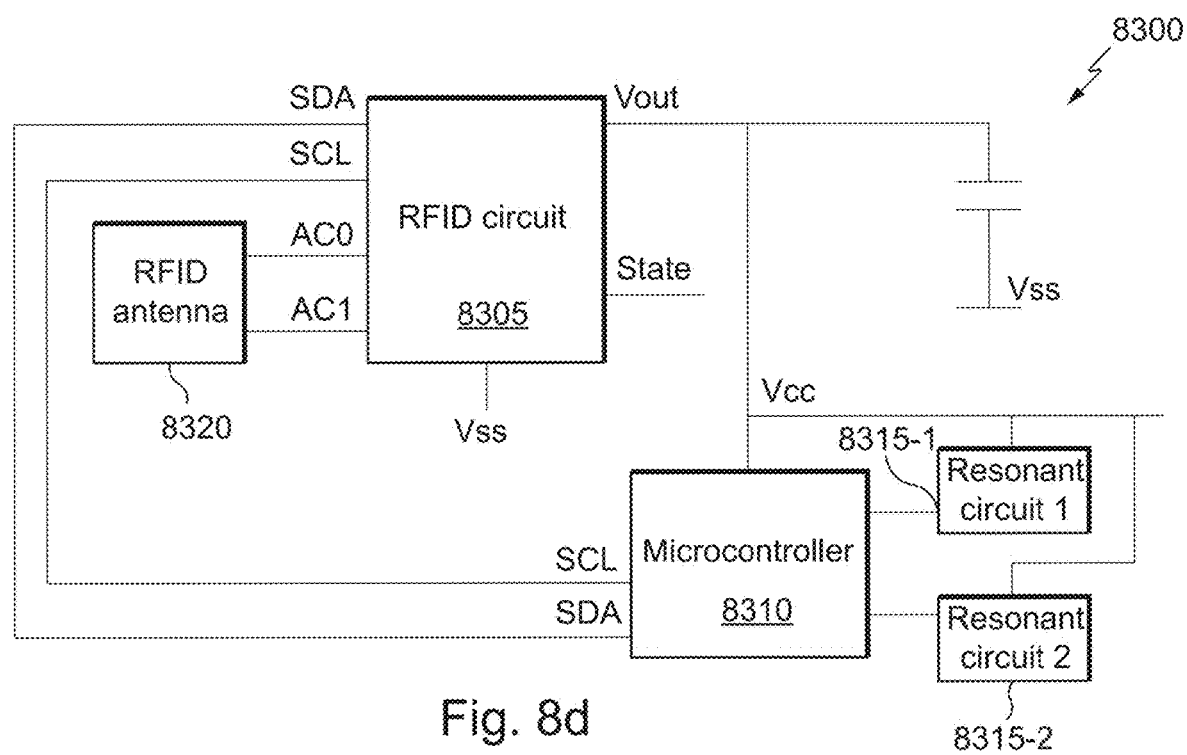

FIG. 8d illustrates a fourth variant of an electronic circuit 8300 of a mobile entity. Like the circuit 8000, the circuit 8300 comprises a standard component 8305 providing functions of RFID type and integrating a dual-port memory (RFID component), a microcontroller 8310 and two resonant circuits 8315-1 and 8315-2, generically referenced 8315. The circuit 800 further comprises an antenna 8320 of RFID type adapted to the characteristics of the circuit 8305. Again, the antenna 8320 is typically a coil linked to the circuit 8305 via the two links AC0 and AC1.

Like for the circuit 8000, the RFID circuit 8305 is connected here to the microcontroller 8310 by a bus of I2C type comprising the links SCL and SDA and the electrical supply terminal Vcc of the microcontroller 8310, like that of the resonant circuits 8315-1 and 8315-2, is connected to the Vout terminal of the RFID circuit 805 delivering a voltage.

However, contrary to the circuit 8000, the synchronization signal of the microcontroller 8310 is not used. To be precise, the synchronization is carried out here based on the value of an item of data, typically one bit, stored in the dual-port memory of the RFID circuit 8305. Therefore, the control of the triggering or stopping of the resonance (enabling the location of the mobile entity), is directly linked to a value of the RFID circuit 8305 here.

Again, the RFID circuit 8305 is linked to the RFID antenna 8320 which enables it to receive electrical energy from the RFID reader and to dialog in reading/writing with the RFID reader to update its memory. Furthermore, as the output Vout of the RFID circuit 8305 is linked to the supply Vcc of the microcontroller 8310 and of the resonant circuits 8315-1 and 8315-2, these three circuits are electrically supplied by the RFID circuit 8305.

As indicated earlier, the synchronization of the microcontroller 8310 is carried out via the reading, here on the I2C bus, of a synchronization bit of which the change of state enables the synchronization to be activated. Such a synchronization bit advantageously has a predetermined address.

The software application running on the RFID reader has the task of generating the change of state of the synchronization bit in the memory of the RFID circuit 8305.

Each mobile entity here comprises at least one solenoid associated with a capacitor, in parallel, to form at least one resonant circuit having the task of emitting a location signal. This resonant circuit is stimulated here by a microcontroller embedded in the mobile entity.

According to an embodiment, the microcontroller situated in the mobile entity stimulates a resonant circuit by one of its outputs configured to generate a pulse-width modulated cyclic signal at a frequency close to the natural frequency of the resonant circuit. The control of the cyclic ratio results in modulating the power emitted by the location module.

It is to be noted here that recent microcontrollers have circuits enabling pulse width modulated signals to be generated. The use of this hardware functionality enables the microcontroller to freely execute instructions of software code during the generation of the signal. Thus, the microcontroller can implement other functions and perform computations without disturbing the timing of the pulse width modulated signal.

Figure 8E:
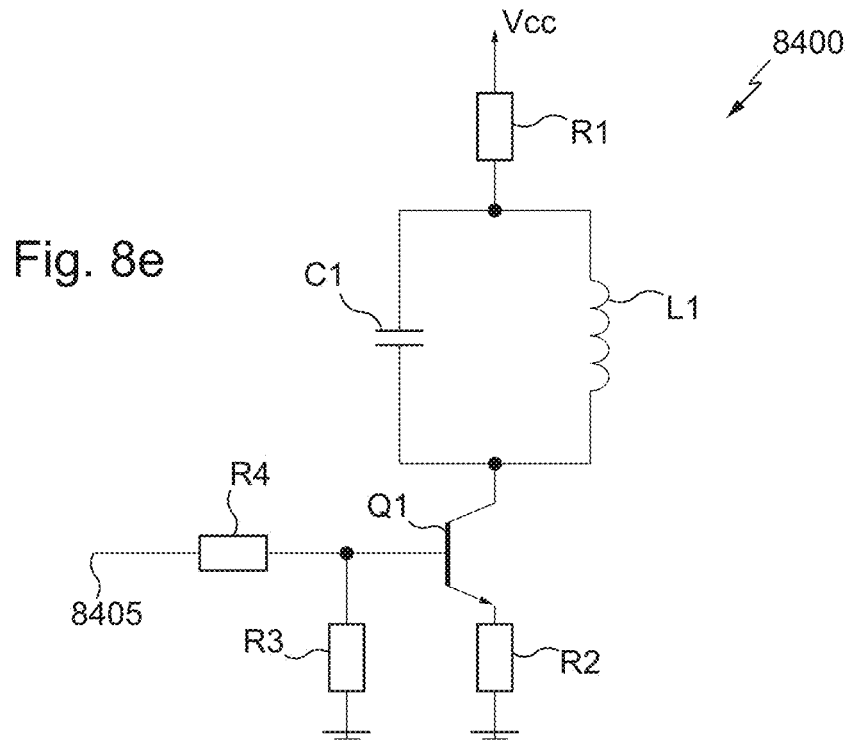

FIG. 8e illustrates an example of a resonant circuit for a mobile entity, controlled by a microcontroller.

The resonant circuit 8400 comprises an input terminal 8405 connected to a microcontroller to receive therefrom a pulse width modulated signal (referred to as a PWM signal). This terminal is connected, via a resistor R4, for example a resistor of 20 k'Ω, to the control terminal of a transistor Q1 used in switching mode. The input from the transistor Q1 is connected to an inductive circuit LC comprising an inductor L1 and a capacitor C1 mounted in parallel. The other branch of this inductive circuit is connected to a resistor R1 connected to a voltage source, for example a regulated voltage of 3.3V. The value of the resistor R1 is equal to 100'Ω here. The value of the inductor L1 is for example 220 ΩH while the value of the capacitor C1 is for example 3.2 nF. The output from the transistor Q1 is connected to a resistor R2 which is moreover connected to ground. The value of the resistor R2 is for example equal to 100'Ω. A pull-down resistor R3 of which the value here is equal to 1 MO connects the control terminal of the transistor Q1 to ground.

The starting and stopping phases of the oscillations are periods of time in which the location signal received by a detection surface is not in general exploitable since it is generally not powerful enough and of an amplitude that is not constant and not controlled. In a utilization in which very many mobile entities are to emit in turn, these starting and stopping times become non negligible relative to the useful emission time during which the electronics of the detection surface is actually able to locate the mobile entities.

Therefore, it is important that the starting and stopping phases be short. For this purpose, on starting, at the time of the first oscillations, the cyclic ratio of the digital signal generated by the microcontroller of the mobile entity is modified to add more power and very rapidly attain the nominal amplitude, preferably in only one or two cycles.

In the same way, during the stopping phase, rather than simply stopping to stimulate the resonant circuit and allowing it to relax at an exponential rate (RLC equivalent circuit), for one or two cycles, the microcontroller adds to each cycle a pulse out of phase with the natural oscillation of the circuit.

Figure 8F:
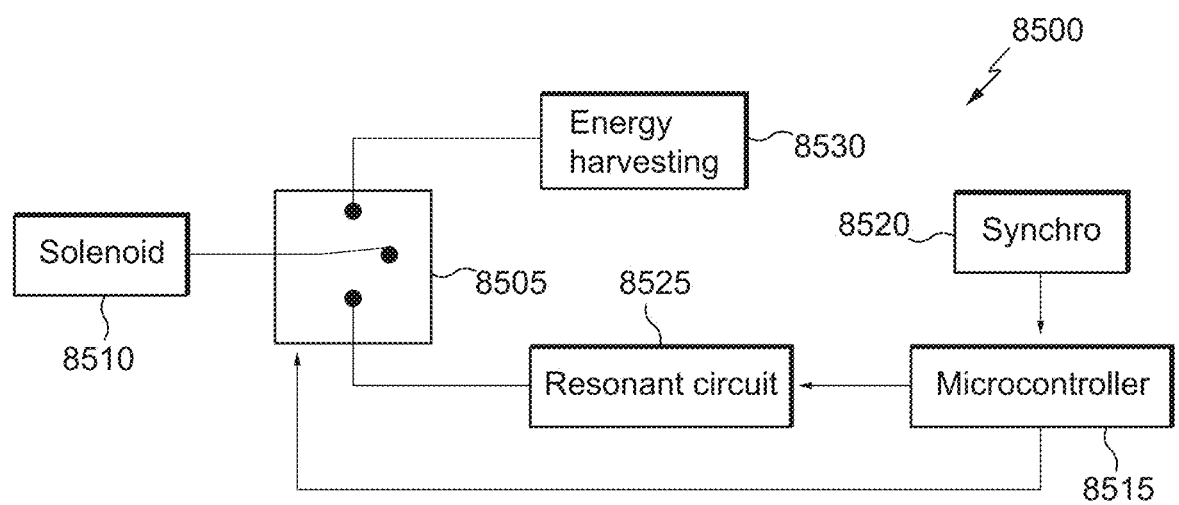
Figure 8G:
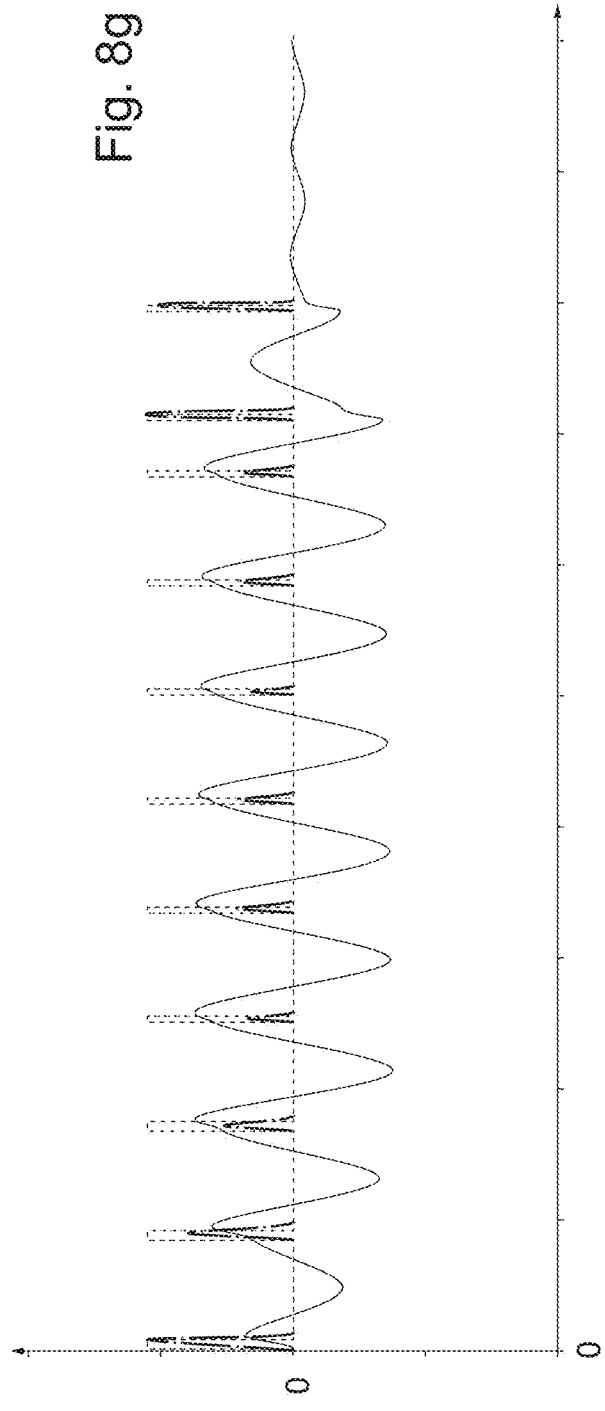

FIG. 8g represents a simulation showing the active control of the starting and stopping phases of the oscillation of an inductor. The time is represented along the x-axis. The signal in continuous line represents the voltage at the terminals of the inductive circuit LC, the signal in dotted lines represents the voltage control pulses from the microcontroller and the signal in bold dotted lines of variable length represents the supply current consumed by the resonant circuit.

It is observed here that the modulation of the power emitted by the resonant circuits of the location modules makes it possible to encode a bitstream corresponding to data to transfer to a computer system linked to the location surface. Knowing the amplitude A1 corresponding to the low state and the amplitude A2 corresponding to the high state of a location signal, it is possible to use an NRZ type modulation (NRZ standing for Non Return to Zero) which enables the detection surface to discriminate the amplitude variations associated with a data transfer, from those which are due to all the causes which may produce a relatively slow variation in the received power (comprising in particular the variation in the distance between the mobile entity and the detection surface as well as the variation in the supply voltage of the mobile entity).

It is also observed that when a mobile entity acquires energy (a function termed energy harvesting) on an RFID carrier, the currents induced in the receiver coil of the mobile entity produce a negative counter-reaction which locally reduces the power of the magnetic field. In the phases in which a mobile entity does not need more energy than that which has already accumulated, it may, preferably, open the circuit of its receiver coil to thereby eliminate the perturbation induced in the local magnetic field. Such a function may in particular be produced using a MOSFET type analog switch (MOSFET being an acronym for Metal Oxide Semiconductor Field Effect Transistor) of low resistance and leakage current.

Moreover, whatever the hardware solution envisioned for the communications, the data transfers to and from the mobile entities may be encrypted according to an encryption system, for example an encryption system based on public and private keys of RSA type (RSA standing for Rivest Shamir Adleman) or AES type (AES standing for Advanced Encryption Standard).

It is observed here that the activation of resonant circuits enabling their location may be carried out by the microcontrollers of the mobile entities, these latter receiving synchronization information from an RFID type signal received from the mobile entity considered. However, this information typically derives from a low frequency signal, for example a signal having a frequency of 1 Hz (such a frequency may be obtained when the synchronization is made by rupture of the remote powering carrier since it is desirable to limit the cut-off frequency).

However, the microcontrollers used must generate pulses in order to trigger each solenoid in a refresh cycle, that is to say a cycle for determining the position and, where appropriate, the orientation of each mobile entity of a set of mobile entities, compatible with a real-time use of the system. Such a refresh frequency is, for example, 60 Hz. At this frequency, each refresh cycle has a period of 16 ms. Pulses must therefore be supplied by each microcontroller every 16 ms, with a temporal offset for the start of each pulse, for each resonant circuit, which depends on a timeslot attributed to the latter. The attribution of such a timeslot may be carried out in accordance with the teaching of patent application WO 2012/028827.

As each microcontroller receives only one low frequency information item, it must have a time base which is specific to itself to generate pulses every 16 ms and adjust that time base as soon as there is an external synchronization signal available. This makes it possible to avoid too great a drift of the internal clock of the microcontroller.

In the situation in which the internal clocks of the mobile entities and the electronics of the location surface do not have exactly the same cadence, the mobile entities compensate for their internal clock based on a comparison of the time measured between two consecutive items of synchronization information with a predetermined theoretical time. It is observed that the longer that time, the more accurate is that correction. Thus, if the measurement of the time is made with an accuracy P and over a predetermined theoretical time D, the accuracy of the clock compensation of the microcontroller is equal to P/D. By way of illustration, if the accuracy is P=10 µs and the time is D=1 s, the accuracy obtained is equal to 1 e-5, i.e. potentially a thousand times better than the +/−2e-2 typical of an internal non-calibrated clock of a microcontroller.

The location modules may also receive energy from radiating rows and columns of a location surface, in particular from the rows and columns used to receive location signals from location modules.

FIG. 8f illustrates an example of a location module making it possible to receive energy from rows and columns of a location surface, that are used to receive location signals from location modules. As illustrated, the location module 8500 is provided here with a switch 8505 enabling the radiation from a solenoid 8510 according to a conventional configuration used for its location. In this configuration, a microcontroller 8515 generates a signal, for example a period signal having a frequency of 200 KHz, according to a synchronization command from a synchronization module 8520. The signal generated is amplified in a resonant circuit 8525 and sent to the solenoid 8510.

The switch 8505 also enables the solenoid 8510 to be used as an energy receiver by inductive coupling, the solenoid 8510 being, for such purposes, connected to an energy harvesting circuit 8530. By way of illustration, such an energy harvesting circuit may comprise rectifying diodes and a capacitor enabling current to be stored in order to be given back later.

The switch 8505 lastly enables one of the two terminals of the solenoid 8510 to be left open such that no current can pass through it. This embodiment is in particular useful in phases during which a mobile entity has no need for more energy than that which has already been stocked, and it thus eliminates the perturbation induced in the local magnetic field. This non-captured energy thus becomes available for mobile entities that are close.

The synchronization information is provided by the synchronization module 8520 which may, for example, be an FM radio receiver, in particular an FM receiver capable of receiving signals having a frequency around 433 MHz. An item of synchronization information must be used to indicate to the microcontroller whether it is to be in location, energy acquisition or "open" mode. This information may be sent in the form of a bitstream by a microcontroller of the location surface.

It is noted here that the RFID protocol uses a HF (High Frequency) carrier which, if continuously emitted, may perturb the process for location of the mobile entities by the location surface. In order to eliminate or at the very least reduce this effect, the RFID carrier is, according to a particular embodiment, continuously emitted with a frequency of approximately 13.56 MHz. Moreover, the implementation of one or more low-pass filters at the input of the detection surface makes it possible to reject that frequency while allowing the signal from the location modules to pass.

According to other embodiments, the RFID carrier is only emitted for one or more timeslots of each refresh cycle, the location modules of the mobile entities being activated outside those timeslots, without risk of perturbation.

Furthermore, in order to reduce its electrical consumption, a mobile entity may place its electronics on standby for the timeslot of each refresh cycle (fixed and repeating), during which it must not activate its location module or send data.

According to a particular embodiment, certain mobile entities do not activate their location modules at each refresh cycle, here denoted T1, but according to a multiple, denoted N, of that cycle, that is to say according to a cycle N×T1. Such an embodiment is in particular adapted to mobile entities intended to be rarely moved on the location surface. This results in enabling the electrical consumption of those mobile entities to be reduced, which may, in synchronized regime, place their electricity consuming components on standby, including those in charge of the reception of a synchronization signal, during a time slot at least equal to (N−1)×T1. The electrical consumption reduction factor is then of the order of N.

Still according to a particular embodiment, the common synchronization signal may comprise at least two distinct signals here denoted SyncA and SyncB, which can be differentiated between by the mobile entities By way of illustration, the signal SyncA is emitted according to a cycle of N cycles of duration T1 whereas the signal SyncB is emitted at each cycle of duration T1. Thus, when a delay index equal to M, with 0<M<N, is attributed to a mobile entity, the latter is activated every N cycles, at a time M×T1 following the reception of the signal SyncA.

It is noted here that, although in theory, a mobile entity only requires the signal SyncA, in practice the use of the signal SyncB is preferable, when the value of M is non-zero, to increase the accuracy of sequencing of the mobile entities.

Figure 8H:
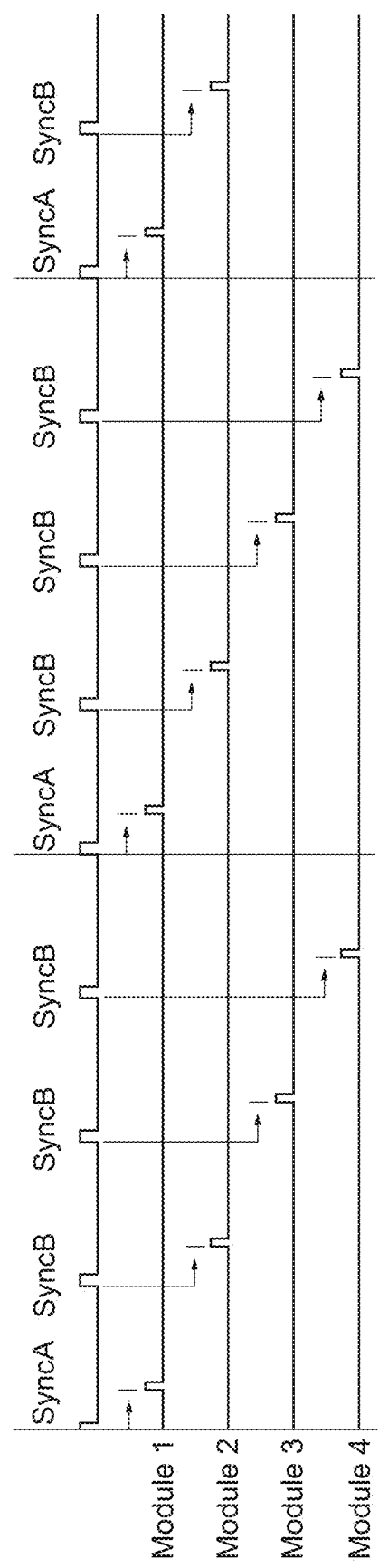

Thus, for example, with reference to FIG. 8h, concerning the module 3 (activated when M=2) and a timeslot equal to three, the module waits, on initialization, for the reception of the signal SyncA then enters a state of standby for a time less than 2×T1. At the end of standby, it awaits the signal SyncB then waits for a time equal to three timeslots to activate an electromagnetic emission (that is to say, typically, to excite a solenoid). It then returns to a state of standby until a time preceding the reception of the signal SyncB of the following cycle N×T1. As from that time, it is, in theory, no longer necessary for the mobile entity to await the signal SyncA. However, to eliminate potential problems of desynchronization, the mobile entity may advantageously verify from time to time, for example once per second, that the reception of the signal SyncA is indeed situated at the time provided in its cycle N×T1. If a drift is observed, the mobile entity preferably performs the full synchronization cycle again as of the reception of the signal SyncA.

The synchronization signals are, for example, sent by frequency modulation of a radio carrier. By way of illustration, the signals SyncA and SyncB are square pulse signals of different direction.

FIG. 8h represents a timing diagram of synchronization when two synchronization signals SyncA and SyncB are used. The signal SyncA is emitted here according to a cycle of N cycles of duration T1 whereas the signal SyncB is emitted at each cycle of duration T1, with T1=25 ms and N=4. The signal SyncA has square pulses of one millisecond duration whereas the signal SyncB has square pulses of one and a half milliseconds length.

The timing diagram represented concerns the activation of four mobile entities each comprising a location module. These mobile entities here share the same timeslot and have delay indices M equal to 0, 1, 2 and 3, respectively.

Still According to a particular embodiment, the location surface as well as each of the mobile entities comprise an electronic system capable of implementing the functionality known under the name of MultiCeiver of the protocol known under the name Enhanced Shockburst (MultiCeiver and Enhanced Shockburst are trademarks), this functionality making it possible to produce the common synchronization signal.

This functionality may in particular be implemented using the electronic component having the reference nRF24LE1 from Nordic Semiconductor. In accordance with this embodiment, the circuit nRF24LE1 of the location surface emits the synchronization signals SyncA and SyncB in the following manner:

each of the mobile entities reserves a logic address ALSYNC of predetermined value and which is identical for all the mobile entities, that address here is reserved in a communication interface called "data pipe 0";

the circuit nRF24LE1 of the location surface sends to the address ALSYNC, at each refresh cycle T1, a data packet comprising at least one byte. For the synchronization signal SyncA, the first byte of the data packet has a first predetermined value and, for the synchronization signal SyncB, the first byte of the data packet has a second value, distinct from the first value used for the synchronization SyncA;

at the mobile entities, the reception of each of these signals produces, with a constant time period, a hardware interrupt which indicates the precise time for the synchronization. Furthermore, by reading the first byte of the received data packet, the software of the nRF24LE1 circuit determines whether it is the synchronization signal SyncA or SyncB.

By way of illustration, the location modules may be integrated into mobile devices such as robots or toys, for example cars or helicopters. The acquisition in real time of the position and orientation of a mobile device as well as the control of actuators thereof make it possible to steer it automatically, for example for it to follow particular paths which may in particular be defined by a software application. For such purposes, the software application used and which runs on a computer, for example a PC (PC standing for Personal Computer), a smartphone or tablet, may send control commands via an interface of SDK type (SDK standing for Software Development Kit). Such control commands are, for example, a direction and speed of rotation of the motors. They are coded and sent to the RFID type reader used which may then send them in the form of an RFID signal, in a write instruction, to an RFID type circuit of a location module.

A microcontroller thereof may then read them from the memory of the RFID type circuit using, for example, an I2C bus. These commands or data representing those commands are, preferably stored in memory at predetermined locations of the RFID type circuit. The microcontroller of the location module is here provided with outputs, for example PWM type outputs, enabling actuators such as motors to be controlled based on information stored in memory in the RFID type circuit.

Naturally, to satisfy specific needs, a person competent in the field of the invention will be able to apply modifications to the preceding description. In particular, although the invention may, for the purposes of illustration, be described, in particular, with reference to the RFID protocol, the invention is not limited to the implementation thereof.

Activation and Location of the Mobile Entities

As described above the location modules to be activated may be identified in analog or digital manner. The analog identification of a location module may be carried out by sending a dedicated frequency, in accordance with several modes, in particular in accordance with a specific carrier frequency for each location module (that frequency identifies the location module which is activated). The embedded electronics thus reacts to the specific carrier which corresponds to it. Alternatively, a single carrier frequency may be used for all the location modules. This frequency modulates a useful signal which is received by each location module. It is the value of the modulated frequency of that useful signal that enables the identification of the location module to detect. The activation frequencies of each location module are, for example, defined in the factory at the time of their assembly and are configured in terms of software in the control module for position sensing and detection.

The digital identification of a location module is carried out by the sending of a code, typically over several bits, in an activation message. This identification mechanism enables great flexibility of use since it enables the programming (and thus the modification) of the identification of each location module.

FIG. 9 illustrate a first example of an algorithm capable of being used to sequentially activate a set of location modules and to compute the positions and/or orientations of the corresponding mobile devices.

A first step consists here of initializing a variable i, representing an index to location modules, to the value zero (step 900). In a following step (step 905), the value of the variable i is compared with the value of a constant M representing the number of location modules supported by the system. Typically, the order of magnitude of the constant M is one hundred. If the value of the variable i is greater than or equal to that of the constant M, the variable i is reinitialized (step 900).

If, on the contrary, the value of the variable i is less than that of the constant M, a test is carried out to determine whether the location module having the index i has been used (step 910), that is to say whether the location module having the index i is valid. The validity of the location modules may be stored in memory in a table which may be updated by an application using the interface formed by the mobile devices comprising those location modules and the location system of those modules. As illustrated by the use of dashed line, this step is optional.

If the location module corresponding to the index i is valid, that module is activated (step 915). As described above, the activation of the location module having the index i consists, for example, of emitting a signal of which the carrier has a frequency characterizing an identifier of that location module.

When the location module having the index i is activated, it emits an electromagnetic field enabling its location by measurement of voltages induced in loops of the detection surface as indicated earlier.

The control module for position sensing and detection is then able to compute the position of the activated location module (step 920).

These items of information are stored in memory to be exploited by the computing module (step 925). They may in particular be stored in memory in a location module position table based on which can be estimated the positions and/or orientations of the mobile devices comprising the location modules.

The variable i is then incremented by one (step 930) and the preceding steps are repeated (steps 905 to 930) until the positions of all the location modules (or valid location modules) have been determined.

Similarly, if the location module corresponding to the index i is not valid (step 910), the variable i is incremented by one (step 930) and the preceding steps are repeated (steps 905 to 930) until the positions of all the location modules (or valid location modules) have been determined.

The position and/or the orientation of each mobile device are computed based on positions of the location modules. This computation may be carried out when the positions of all the valid location modules have been computed or, mobile device by mobile device, when the positions of all the valid location mobile device belonging to the same mobile device have been computed.

It is noted here that the validity of location modules may in particular by linked to the logic of the application using the interface formed by the mobile devices comprising those location modules and the location system of those modules. By way of illustration, in the case of a game, the non-valid location modules may correspond to mobile devices representing pawns not used in the game, for example pieces having been taken in a game of chess or pawns not used in a given game scenario.

FIG. 10 illustrate a second example of an algorithm capable of being used to sequentially activate a set of location modules and to compute the positions and/or orientations of the corresponding mobile devices.

This algorithm makes it possible in particular to manage the fact that certain mobile devices may leave the zone of movement (that is to say here the detection surface) and that the positions and/or orientations of the corresponding mobile devices no longer require to be estimated. A secondary software loop however monitors their possible re-inclusion on the detection surface and the ensuing need to again estimate their positions and/or orientations. This algorithm makes it possible, in comparison with the algorithm described with reference to FIG. 9, to reduce the overall duration of the sequence for activation of all the location modules by dynamically managing their validity.

In this algorithm, the constant M corresponds to the maximum number of location modules supported by the system, the variable i characterizes the index of a location module, the table P corresponds to the table of positions of the location modules, the table V corresponds to the table of validity of the location modules, the variable C is an overall variable corresponding to the total number of location modules used, K is a predetermined constant corresponding to the maximum number of iterations of searching for location modules outside the detection surface (a typical value for K is of the order of ten) and A is a variable representing a count-down index of the iterations of searching for the location modules situated outside the detection surface for an overall cycle.

A first step is directed to initializing the variables i and C to zero (step 1000). In a following step the value of the variable i is compared to that of the constant M (step 1002). If the value of the variable i is less than that of the constant M, the location module validity table is updated such that the location module corresponding to the index i is considered as valid (step 1004). The variable i is then incremented by one (step 1006) and the new value of the variable i is compared to that of the constant M (step 1002). Steps 1002 to 1006 enable the location module validity table to be initialized.

If, on the contrary, the value of the variable i is greater than or equal to that of the constant M, the variable i is reinitialized to zero (step 1008). In a following step the value of the variable i is again compared to that of the constant M (step 1010). If the value of the variable i is less than that of the constant M, a test is carried out to determine whether the location module corresponding to the index i is valid (step 1012).

If the location module corresponding to the index i is valid, that module is activated (step 1014) such that it emits an electromagnetic field enabling its location by measurement of voltages induced in loops of the detection surface.

The control module for position sensing and detection is then able to compute the position, and, where required, the orientation, of the activated location module (step 1016).

A test is then carried out on the coordinates obtained from the location module (step 1018). If those coordinates are zero, the location module validity table is updated such that the location module corresponding to the index i is considered as not valid (step 1020). In the opposite case, if those coordinates are not zero, those coordinates are stored in memory to be exploited by the computing module (step 1022). They may in particular be stored in memory in the location module position table based on which can be estimated the positions and/or orientations of the mobile devices comprising those location modules, as described previously.

The variable i is then incremented by one (step 1024) and its value is again compared to that of the constant M (step 1010).

Similarly, if the location module corresponding to the index i is not valid (step 1012), the variable is incremented by one (step 1024) and its value is again compared with that of the constant M (step 1010).

If the value of the variable i is greater than or equal to that of the constant M (step 1010), the value of the variable A is initialized to the value zero (step 1026). A test is then carried out to compare the value of the variable A with that of the constant K (step 1028). If the value of the constant K is less than or equal to that of the variable A, the value of the variable i is reinitialized to zero (step 1008) and the steps described previously are repeated.

In the opposite case, a test is carried out to determine whether the location module corresponding to an index of which the value is equal to C is not valid (step 1030).

In the affirmative, that module is activated (step 1032) such that it emits an electromagnetic field enabling its location, for example by measurement of voltages induced in loops of the detection surface.

The control module for position sensing and detection is then able to compute the position of the activated location module (step 1034).

A test is then carried out on the coordinates obtained from the location module (step 1036). If those coordinates are zero, the location module validity table is updated such that the location module corresponding to the index of which the value is equal to that of the variable C is considered as not valid (step 1038). In the opposite case, the location module validity table is updated such that the location module corresponding to the index of which the value is equal to that of the variable C is considered as valid (step 1040).

The values of the variables A and C are then incremented by one (step 1042). Similarly, if the location module corresponding to an index of which the value is equal to that of the variable C is not valid (step 1030), the values of the variables A and C are then incremented by one (step 1042).

A test is then carried out to compare the value of the variable C with that of the constant M (step 1044). If the value of the variable C is less than that of the constant M, the values of the variable A and of the constant K are compared (step 1028) and the steps described previously are repeated.

If the value of the variable C is greater than or equal to that of the constant M, the value of the variable C is reinitialized to the value zero (step 1046). The values of the variable A and of the constant K are then compared (step 1028) and the steps described previously are repeated.

Control of the Host Device

Returning to the context of FIG. 5, is assumed that at least one mobile device is disposed on a host device or in the vicinity thereof. The mobile device may be placed on an upper surface of the host device (or interacting surface) or be located in the vicinity of thereof. It is considered that the mobile device is in the vicinity of the host device or in the vicinity of an upper surface thereof when the mobile device is close enough to the detection layer of the host device for it to be possible to detect the magnetic field emitted by the mobile device (or more specifically emitted by a location module thereof).

A user manipulates the mobile device and imparts to it a movement relative to the upper surface of the host device. According to the movement of the mobile device, the host device determines a command to execute.

To that end, for each mobile device in the vicinity of the host device, the latter stores, in a sliding history, positions of their location module or modules. For example, such position comprises the x-coordinate and the y-coordinate of the mobile device relative to the interacting surface. These are for example defined according to the impact points of the electromagnetic field on the detection surface. The position may further comprise the distance between the mobile device and the interacting surface (that is to say) its altitude. The latter may be defined according to variations in the electromagnetic power measured.

When the host device has available the movement history of the mobile device in the history record over a temporal window (for example of the order of one second), it is possible to compare the form of the moment to a reference movement diagram (or model) to be recognized. Each movement diagram is associated with a reference movement (that is to say a gesture made by the user with the mobile device).

Figure 11A:
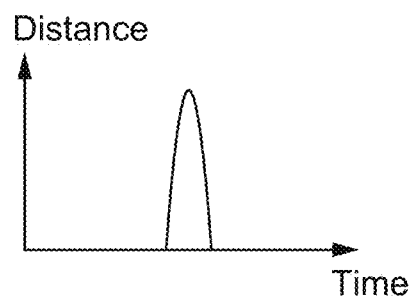
FIGS. 11a-11d illustrate reference movements of mobile devices.

FIG. 11a illustrates a click movement. In this movement, the user rapidly lifts and replaces the mobile device relative to the host station. The host station then detects a rapid variation in altitude in one direction then in the other (moving away of the host station then moving back). For example, this variation is made within a time of the order of half a second or less. FIG. 11a is a graph presenting the reference movement diagram associated with the click movement, showing the change in altitude of the mobile device relative to the host station over time.

Figure 11B:
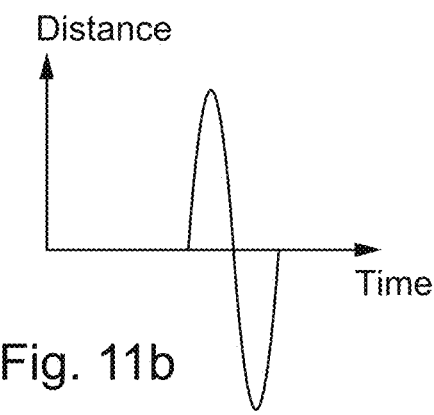

FIG. 11b illustrates a back-and-forth movement. In this movement, the user rapidly moves the mobile device away from an initial position then back while remaining in the same plane of the interacting surface for interaction with the host device. FIG. 11b is a graph presenting the reference movement diagram associated with the back-and-forth movement, showing the change in distance, in a plane parallel to the interacting surface of the host device, between the position of the mobile device and an initial position.

Figure 11C:
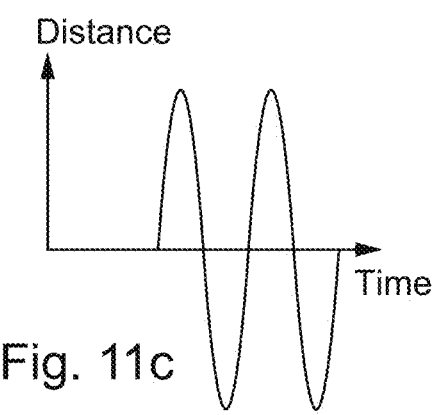

FIG. 11c illustrates a shake movement. In this movement, the user makes several successive back-and-forth movements with the mobile device. FIG. 11c is a graph presenting the reference movement diagram associated with the shake movement, showing the change in distance, in a plane parallel to the interacting surface of the host device, between the position of the mobile device and an initial position.

Figure 11D:
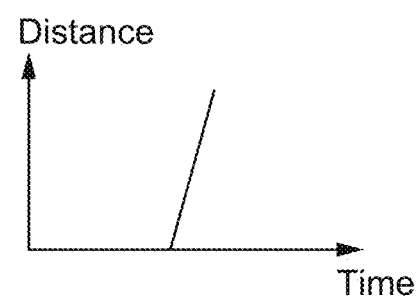

FIG. 11d illustrates a slide movement. In this movement, the user makes the mobile device perform a rectilinear displacement in a plane parallel to the interacting plane of the host device. FIG. 11d is a graph presenting the reference movement diagram associated with the slide movement, showing the change in distance covered by the mobile device in a plane parallel to the interacting surface of the host device.

Some mobile devices may comprise a plurality of location modules, for example containing solenoids, to generate inductor magnetic fields. It is thus possible to determine for these mobile devices, their orientation according to an axis orthogonal to the interacting surface of the host device. A rotational movement imparted by a user to a mobile device may thus be detected by the host device.

When one or more of the movements referred to above, or others, is detected, it is associated with a command of the host device.

For example, the click may make it possible to activate a predefined action or to validate a choice from a menu displayed to the user.

The shake may for example enable an action in course to be cancelled or activated (that is to say to perform an "undo" type operation typically present in computer applications).

According to still another example, the slide may enable a selection to be made or to vary a slider value.

The rotation may for example enable a selection to be made from a plurality of contextual items displayed to a user or to vary a curving slider value (in the manner of a potentiometer).

Movements may be combined to give interfaces of a new type, based on the exclusive use of objects and without requiring the use of an associated touch screen or a keyboard and mouse. Such objects may however be used as a complement.

Examples of implementation of commands of the host device are described below with reference to FIGS. 12a to 12g.

Figure 12A:
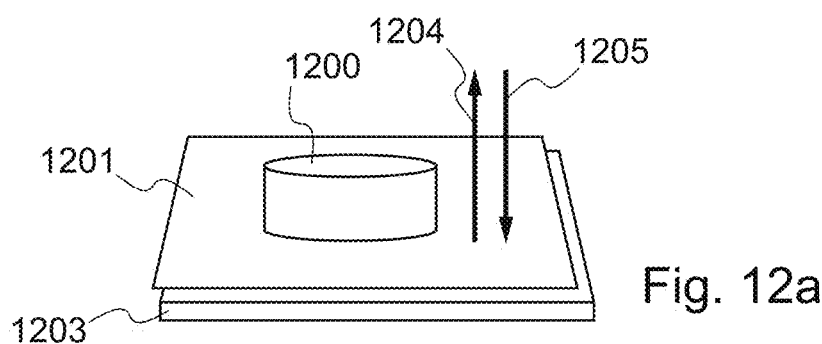
FIGS. 12a-12g illustrate commands associated with reference movements.

As illustrated in FIG. 12a, a mobile device 1200 is on a screen 1201 itself superposed over a host device 1203. The screen may form part of the host device. Alternatively, the mobile device may be disposed over the host device and the screen may be remotely located, that is to say not integrated into the host device.

When a user performs a click with the mobile device by raising the device upward (arrow 1204) then putting it down again (arrow 1205), the host device detects it and executes a command associated with that movement.

Figure 12B:
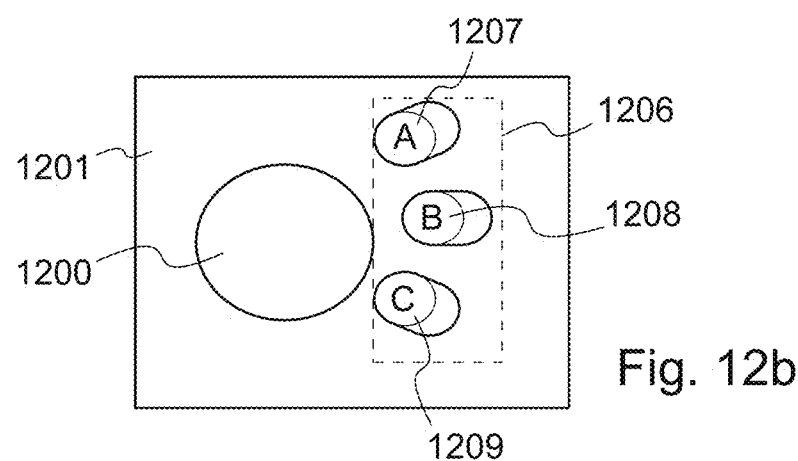

This is for example the display of a menu 1206 as illustrated by FIG. 12b. This menu displays for example around the position of the pawn. According to a further example, this menu comprises contextual items 1207, 1208, 1209 such as icons or text.

Alternatively or in combination, the execution of the command associated with the movement is not accompanied by a display, but is accompanied by a triggering of a sound or of a light-emitting item associated with the command. The light-emitting item may be disposed at the location of the interacting surface or on the remote device.

Figure 12C:
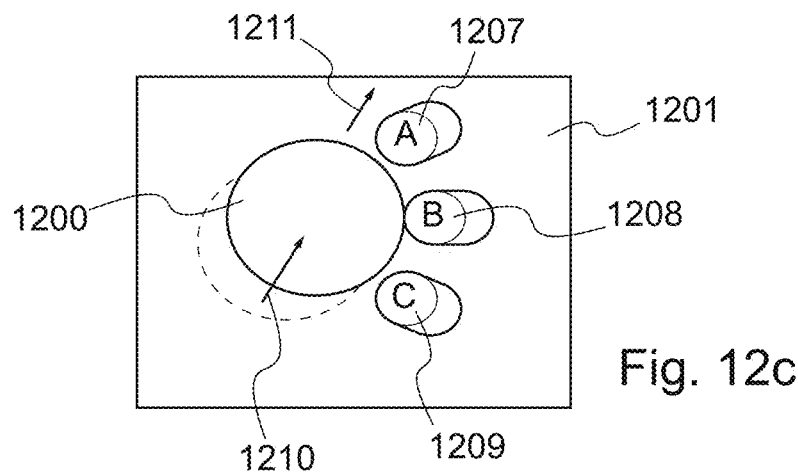

To select a contextual item, it is for example possible to perform a slide movement, as illustrated in FIG. 12c. For example, the user displaces the mobile device towards item 1207 (arrow 1210). In order to provide visual feedback to the user, the item 1207 may for example be displayed as sinking into a slot, as though pushed by the pawn (arrow 1211).

Figure 12D:
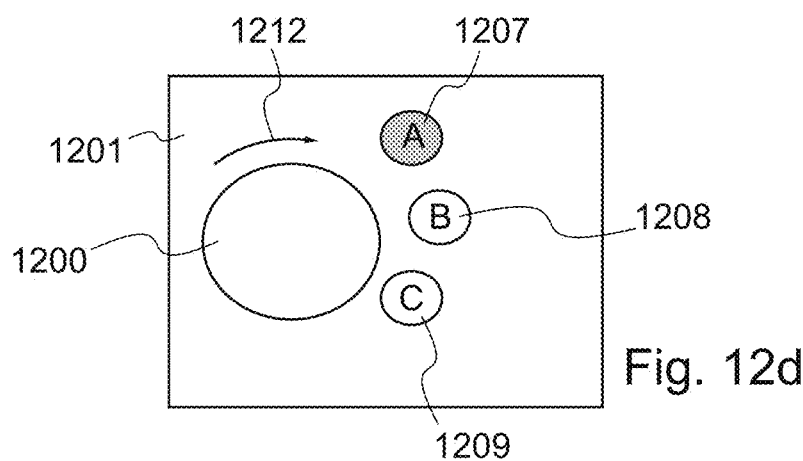
Figure 12E:
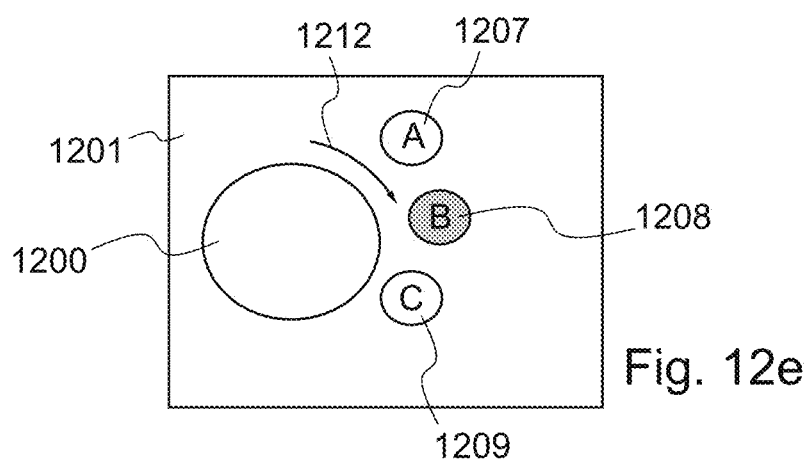

FIG. 12d illustrates the selection of a contextual item by means of a click and a rotation. The mobile device is located for example oriented towards the contextual item 1207. This item is then highlighted. Next, as illustrated by FIG. 12e, the user imparts a rotational movement to the mobile device around an axis orthogonal to the screen 1200 (arrow 1212) towards another contextual item, for example the item 1208. This item is then highlighted and the item 1207 returns to its initial appearance (no highlight).

To validate the selection of the item 1208 and to trigger the associated action or command, the user may then perform a click movement.

Alternatively, the validation may be carried out passively by leaving the mobile device motionless for several seconds after having selected the contextual item, without requirement to combine with a click movement.

Figure 12F:
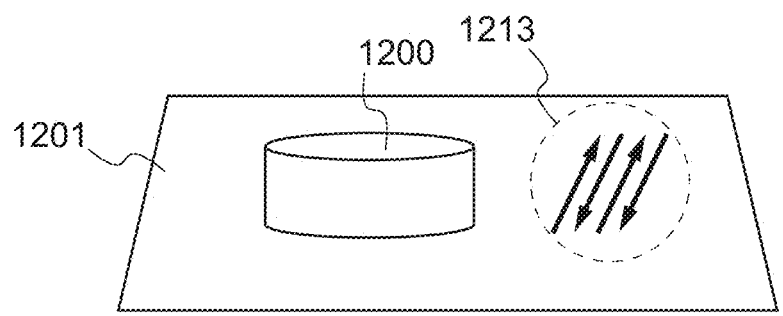

With reference to FIG. 12f, a description is given of carrying out the shake movement to activate an action cancellation command. This cancellation enables a change of mind over an action undertaken by the user in order to return to the state the host device was in prior to the user's action. For example, the user imparts a back-and-forth or shake movement to the mobile device (arrow 1213). The system then returns to the state prior to the activation of the cancellation action.

The forms of use of movements (or gestures) imparted to the mobile devices are not limited to those presented above. It is possible to provides other ones. Furthermore, the combinations of movements presented are not limiting, it is possible to modify them or provide other ones. Furthermore, the associations between the movements and the commands (or actions) presented above are not limiting.

In particular, the activation of an action may be carried out by detection of a single click movement without combination with other gestures. This is for example the case when the action associated with a mobile device is unique and does not therefore justify a choice between several options. The click movement may immediately trigger the unique action associated with the mobile device.

Figure 12G:
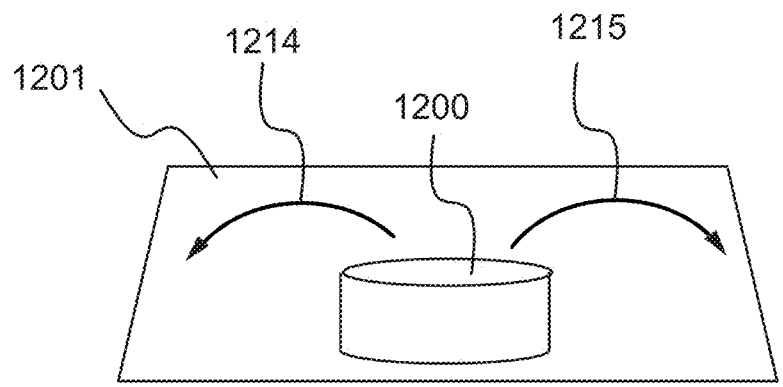

With reference to FIG. 12g, a movement will be described enabling an action to be cancelled or to restore an action. When the user has triggered an action by a movement of the mobile device, he may cancel it by performing a semi-circle leftward (arrow 1214) with the mobile device. The triggered action is then cancelled. If after having cancelled that action, the user wishes to restore it, that is to say to cancel the cancellation, he can perform a semi-circle rightward (arrow 1215) with the mobile device.

Figure 13:
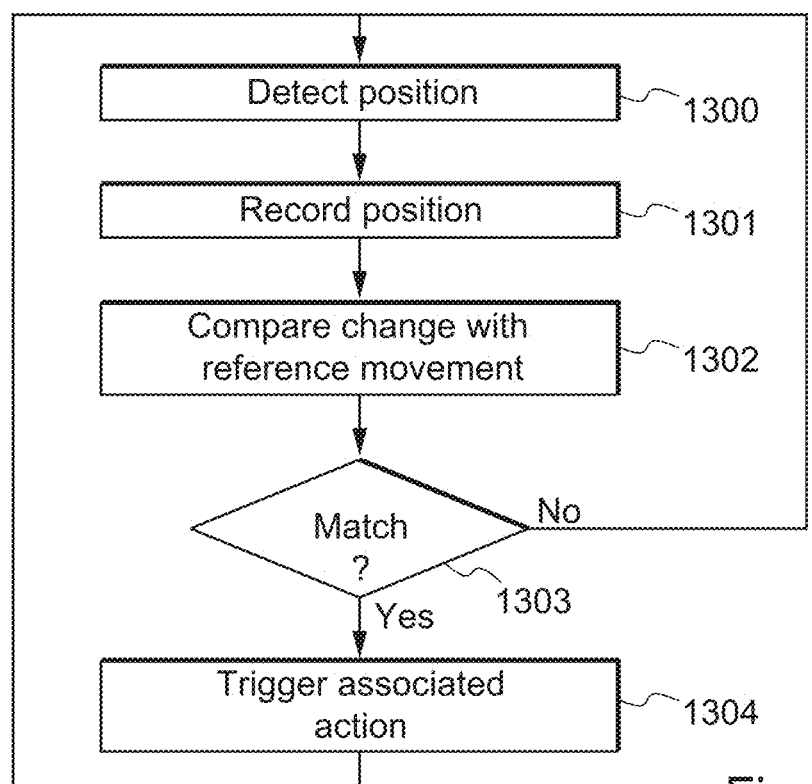
FIG. 13 is a flowchart of steps implemented in embodiments.

FIG. 13 is a flowchart of steps implemented within the host device according to embodiments;

In a first step 1300, the current position of a mobile device is determined. This may be its distance relative to the interacting surface of the host device, and/or its coordinates in a frame of reference associated with that surface and/or an orientation of the mobile device according to an axis orthogonal to that surface. Step 1300 may be triggered by the reception of an activation signal from the mobile device.

Once the position has been detected, it is recorded at a step 1301 in a history of the positions of the mobile device. This history concerns a sliding temporal window, that is to say that the history comprises the last positions detected over a given period of time, for example a few seconds, and that each new position erases the oldest position.

The history of the positions makes it possible at every instant to compare, at a step 1302, the change in these positions, that is to say the movement of the mobile device, to reference movements as discussed above (click, back-and-forth, shake, rotation or other movements).

If it is determined at a step 1303 that the movement of the mobile device does not correspond to a reference movement (NO), the process returns to step 1300. Otherwise (YES), a command (or action) associated with that reference movement is triggered at a step 1304.

According to embodiments, a neural network system is used to recognize the reference movements. For example, the reference movements are identified by the system by learning based on movements of the mobile device. During this learning a state, or a signature, of the neural network may be identified by the system which associates it with a reference movement. Subsequently, when that movement is repeated, it again places the neural network in the same state which enables it to recognize the reference movement.

In this type of embodiment, comparison position by position is not carried out between those of the reference movement to recognize and those of the movement which has just been carried out and stored in the history. It is rather a matter of comparing a current state of the neural network (or signature) with a reference state (or signature).

Mobile Devices with an Interface

The mobile devices may comprise one or more user interfaces enabling the sending of signals to the host device to be triggered.

For example, a microcontroller in the mobile device makes it possible to manage the location modules (containing for example oscillators linked to solenoids) and to have several digital inputs which it is possible to link to one or more types of switch disposed on the mobile device: a push button, a slider, a wheel or other switch.

The microcontroller may moreover code information sent to the host device via communication protocols such as already described above, for example the RFID protocol.

However, other modes of communication may be envisioned.

For example, it is possible to exploit "capacitive sensing" technology which enables such interfaces (push buttons, slides, wheels or other interfaces) to be implemented by a touch zone at the surface of the mobile device or very close to the surface which makes it possible to react to the touch of the user's skin. This technology may be managed by microcontroller and has the advantage of providing a non-mechanical wear-resistant solution.

According to a further example, the microcontroller sends information to the host device by varying the activation time of the solenoid which it comprises. For example, when the interface of the mobile device is not put into action, that activation time has a different duration from that which it has when the interface is in action. Thus, for example, if the mobile device has a push button, and that button is pushed in, the activation time of the solenoid is different from that when the push button is not activated. By way of illustration, the activation time may pass from 1 ms to 1.5 ms when the interface is put into action.

According to another example, the microcontroller sends a PWM signal (PWM standing for Pulse Width Modulation) to a radiating amplifier to change the emission frequency of the mobile device solenoid. By way of illustration, the activation time may pass from 200 kHz to 210 kHz when the interface is put into action.

Other examples are possible, such as the sending of a binary frame by modulating the signal emitted by the solenoid.

Figure 14A:
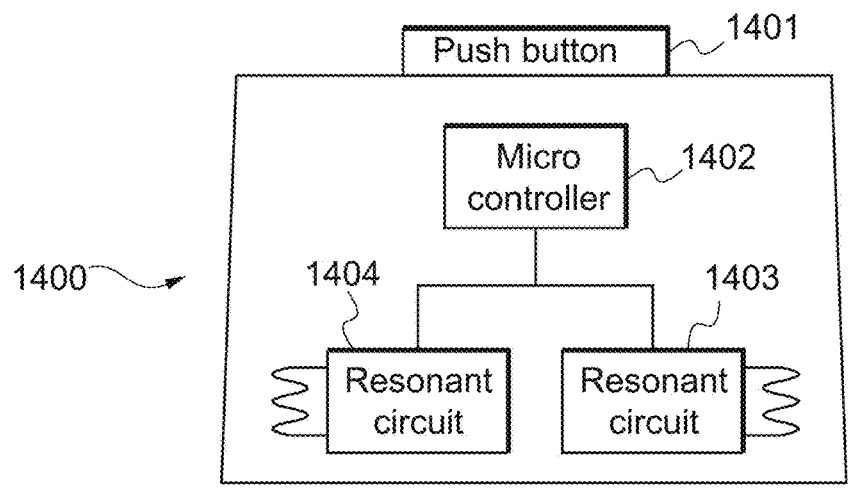
FIGS. 14a-14c illustrate embodiments of mobile devices with a user interface.

FIG. 14*a* illustrates a mobile device 1400 comprising a push button 1401, for example disposed at the vertex of the mobile device. For example, when the push button is operated, a signal is sent by the mobile device to the host station to trigger a position detection.

According to a further example, when the push button is operated, a signal is sent, by the mobile device to the host station, which the mobile device assimilates to click movement. The push button then serves as an alternative interface or complementary interface.

The push button is for example managed by a microcontroller 1402 also given the task of managing location modules with resonant circuits 1403, 1404 (solenoids or other circuits).

Figure 14B:
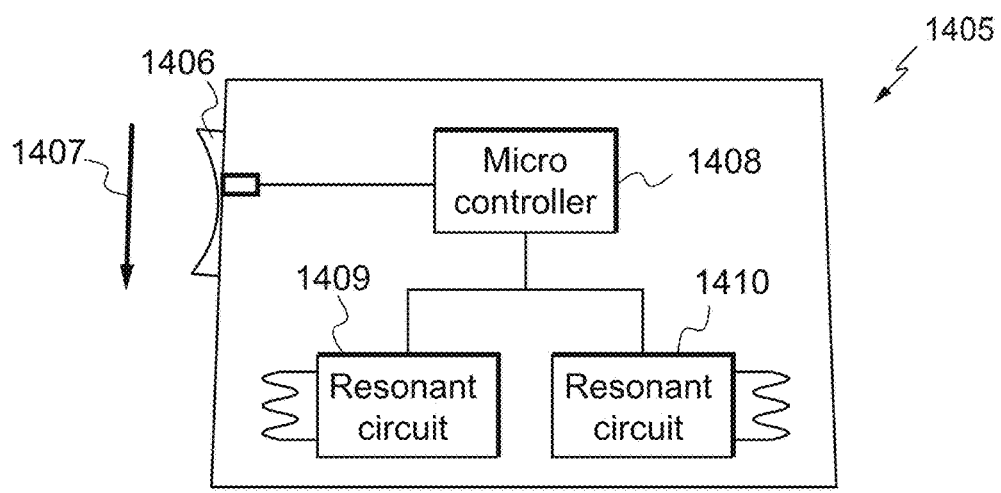

FIG. 14*b* illustrates a mobile device 1405 comprising a slide or a wheel 1406, for example disposed on a side face of the mobile device. For example, when the slide is operated, a signal representing the position of the slide in its travel (arrow 1407) is sent by the mobile device to the host station.

The slide may serve as an alternative interface or complementary interface. The commands associated with the slide may for example be a "zoom in/zoom out", forward/backward translation of the image, or other command. The slide or the wheel may enable information coded between a minimum and a maximum to be sent to the host device. It is then possible to associate a specific command with that variation in value.

The slide is for example managed by a microcontroller 1408 also given the task of managing location modules with resonant circuits 1409, 14010 (solenoids or other circuits).

Figure 14C:
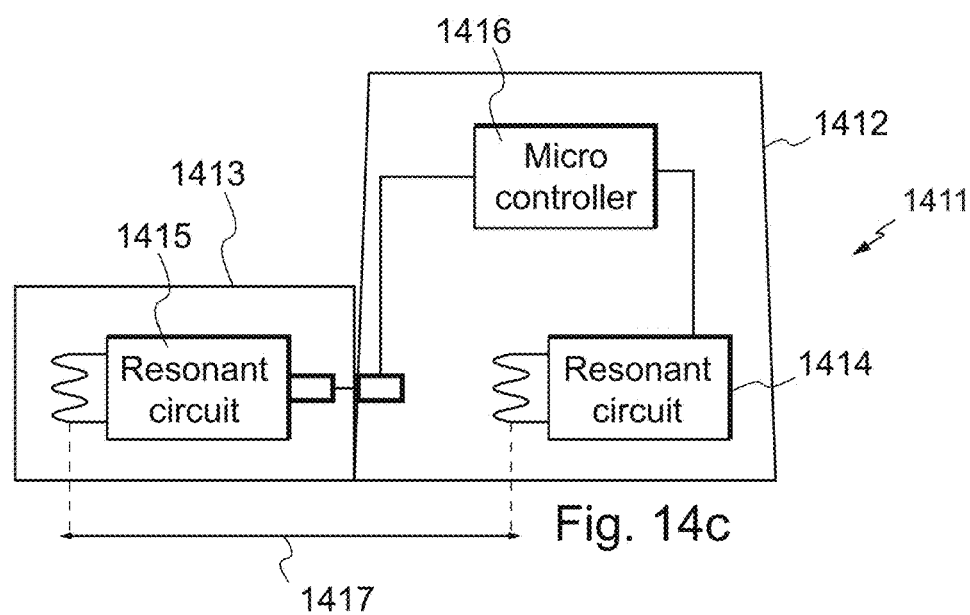

FIG. 14*c* illustrates a mobile device 1411 comprising a main body 1412 and a secondary body 1413. The main body comprises a location module 1414 (for example with a solenoid) and the secondary body comprises a location module 1415 (for example with a solenoid). The main body comprises for example a microcontroller 1416 to control the location modules.

The secondary body is movable relative to the main body. Thus, the distance d (arrow 1417) separating the location modules 1414 and 1415 is variable. For example, a user may take the main body between her fingers and move the secondary body with her thumb.

The relative disposition of the two location modules for example makes it possible to provide a rotation detection function.

It is then possible to perform relative movements of the location modules, for example by way of alternative interface or complementary interface for the rotation movements.

EXAMPLES OF APPLICATIONS

According to the intended application, it may be necessary to limit the exploitation of the system (comprising a host device and at least one mobile device) to a subset of available location modules or to associate a particular function with certain location modules. Thus, in an initialization phase of the system, it may be necessary to define a list of location modules of which the position is not to be computed (their electromagnetic emission is not activated by the activation module). This list may vary over time and may differ from its initial value defined at the time of the initialization phase. It is also possible, in an initialization phase, to attribute a specific role or function to a location module or to a mobile device. Thus, for example, a mobile device associated with a predefined location module may play the role of a King if that mobile device is exploited in a chess game program, that same mobile device may also play the role of an eraser or a felt-tip pen in a drawing application or for instance have the role of a car in a road-use education program.

By way of example, the association between location modules and a function may be made by disposing the mobile devices comprising those location modules on specific parts of the detection surface and triggering a recording. The control module for position sensing and detection then performs a complete activation sequence and the roles are associated according to the respective positions of the mobile devices (for example pieces from a team A versus pieces from a team B).

When a screen is superposed on the detection surface, it is possible to choose a role from a context menu for each mobile device by displaying a menu, near the position of each mobile device, proposing the different possible roles.

A particular application of the invention concerns board games by enabling the agreeable aspect of the board games and the pleasure of manipulating actual pawns or figurines to be maintained while profiting from the interactivity and dynamism of video games. In this field of application, a large touch screen is, preferably, superposed on the detection surface for the pieces.

The location modules are advantageously placed in bases of the figurines used in the game so ensuring the detection of the position of the figurines in the game.

The touch screen may display the game track on which the figurines will move, so giving a dynamic visual medium. Typically, the screen displays the environment in animated and realistic form in which the figurines are immersed (colors in a space ship for a science fiction game, geographical regions for a "risk" type game, a chess board if the figurines are chess pieces, etc.).

On starting a game, the system proposes an attribution of functions to the mobile devices in order to enable the program to produce a relation between the identifier of one or more detection modules and the figurine represented by that mobile device. This may be carried out by displaying a specific menu for role selection on the screen near the position of each figurine disposed on the board.

When the pieces have been recorded, that is to say that their roles have been assigned to them, they become veritable game interfaces. The system can then continuously verify that the movements of the figurines do indeed respect the limits of movement required by the rules of the game by taking into account their role in the game (move from square to square in a corridor for example, comply with the appropriate movements for a game of chess, etc.). The system can also compute and display on the screen the lines of sight between two figurines in a game of combat or automatically compute and display the possible takes in chess. It is also possible to trigger contextual visual animations under a figurine or based on a figurine. Thus selecting the shooting of a weapon from the menu of a figurine may make a specific flash appear around the shooter and the display of tracer bullets between two figurines. In similar manner, it is possible to trigger contextual audio animations when the relative position of two figurines so enables. For example, on movement of a figurine, the system determines the existence of a line of sight with another figurine, an audio alarm "target in view" may be triggered by the system.

Similarly, it is possible to display context menus depending on the position of the figurines (a menu for calculating the result of a hand to hand combat displays if two enemy figurines are at a minimum distance), give an automatic on-line help when a player makes a prohibited move with its figurine and modify the display on the screen when the players perform rotations with the figurines.

As described above, the figurines may be used as an interface to navigate in the menu thanks to click, back-and-forth, slide or other movements.

To meet specific needs, a person competent in the field of the invention will be able to apply modifications to the preceding description.

A computer program for the implementation of a method according to an embodiment of the invention may be produced by the person skilled in the art on reading the flow chart of FIG. 13 and the present detailed description.

Of course, the present invention is not limited to the described embodiments, other variants and combinations of features are possible.

The present invention has been described and illustrated in the present detailed description with reference to the appended Figures. However the present invention is not limited to the embodiments presented. Other variants and embodiments may be deduced and implemented by the person skilled in the art on reading the present description and appended Figures.

In the claims, the term "comprise" does not exclude other elements or other steps. The indefinite article "a" does not exclude the plural. A single processor or several other units may be used to implement the invention. The different features presented and/or claimed may advantageously be combined. Their presence in the description or in different dependent claims, does not indeed exclude the possibility of combining them. The reference signs are not to be understood as limiting the scope of the invention.

The invention claimed is:

1. A method of controlling a host device for at least one mobile device, the method comprising steps of:
   a first determining step of determining (1300) a current position of said at least one mobile device relative to an interacting surface of the host device by at least one inductor magnetic field inducing at least one electrical signal in at least one electrical circuit (115) of the host device;
   saving (1301) said current position in a position history file, said position history file comprising a set of positions including one or more previous positions of said at least one mobile device over a sliding temporal window, said position history file being stored in a memory device;

comparing (1302) a form of an actual movement of said at least one mobile device relative to the interacting surface of the host device determined utilizing said current position and at least one of said previous positions of said set of previous positions from said position history file with at least one reference movement diagram, said at least one reference movement diagram being associated with at least one reference movement of the at least one mobile device relative to the interacting surface of the host device; and a second determining step of determining that said form of the actual movement corresponds (1303) to said at least one reference movement and triggering (1304) a command of the host device according to said at least one reference movement, wherein said current position comprises:
- a distance between the at least one mobile device and said interacting surface,
- a coordinate of the at least one mobile device in a frame of reference associated with said interacting surface, and
- an orientation of the at least one mobile device according to an axis orthogonal to said interacting surface.

2. The method according to claim 1, further comprising steps of:
- displaying, on a screen of the at least one mobile device, at least one contextual item for selecting said command, said at least one contextual item being displayed at a position on the screen representing the current position of said at least one mobile device relative to said interacting surface,
- selecting said at least one contextual item according to a first identification of a first one of said at least one reference movement, and
- said triggering of said command is according to a second identification of a second one of said at least one reference movement.

3. The method according to claim 2, wherein said interacting surface is superposed on said screen.

4. The method according to claim 2, wherein said screen is situated away from said host device.

5. The method according to claim 1, wherein:
- a change in the current position of said at least one mobile device comprises a fast variation in a distance between the at least one mobile device and the interacting surface, and
- said at least one reference movement is a click.

6. The method according to claim 5, wherein said command comprises activation of a selected action.

7. The method according to claim 1, wherein:
- a change in the current position of said at least one mobile device comprises a succession of fast variations in a distance between the at least one mobile device and a reference position in a frame of reference associated with said interacting surface, and
- said at least one reference movement is a shake.

8. The method according to claim 7, wherein said command comprises cancellation of an action in course.

9. The method according to claim 1, wherein:
- a change in the current position of said at least one mobile device comprises a slow rectilinear movement of the at least one mobile device relative to said interacting surface, and
- said at least one reference movement is a slide.

10. The method according to claim 9, wherein said command comprises a variation of a slider according to movement of the at least one mobile device.

11. The method according to claim 1, wherein:
- a change in the current position of said at least one mobile device comprises a rotation thereof relative to an axis orthogonal to said interacting surface, and
- said at least one reference movement is a rotation of the at least one mobile device between a first direction and a second direction.

12. The method according to claim 11, wherein said command comprises selecting a contextual item displayed on a screen and situated in said second direction.

13. The method according to claim 1, further comprising:
prior to said first determining step, a further step of the host device receiving an activation signal generated by the at least one mobile device further to an actuation of a user interface on the at least one mobile device to activate the first determining step of determining (1300) the current position of the at least one mobile device.

14. A non-transitory computer storage medium having stored thereon a computer program comprising instructions loadable and executable on a processor of the host device that, upon execution by the processor of the host device, causes the host device to implement the method according to claim 1.

15. A host device (105, 500), comprising:
- at least one interacting surface (502) that interacts with at least one mobile device (501, 505);
- at least one electrical circuit (115);
- a position history file, said position history file comprising a set of positions including one or more previous positions of said at least one mobile device over a sliding temporal window, said position history file being stored in a memory device;
- at least one reference movement diagram, said at least one reference movement diagram being associated with at least one reference movement of the at least one mobile device relative to the at least one interacting surface; and
- a processing unit (255) that controls the host device, the processing unit configured to carry out the following:
  - a first determining step of determining (1300) a current position of said at least one mobile device relative to the at least one interacting surface by at least one inductor magnetic field inducing at least one electrical signal in the at least one electrical circuit (115),
  - saving (1301) said current position in the position history file,
  - comparing (1302) a form of an actual movement of said at least one mobile device relative to the at least one interacting surface, determined by utilizing said current position and at least one of said previous positions of said set of previous positions from said position history file, with said at least one reference movement diagram, and
  - a second determining step of determining that said form of the actual movement corresponds (1303) to said at least one reference movement and triggering (1304) a command of the host device according to said at least one reference movement, wherein said current position comprises:
- a distance between the at least one mobile device and said interacting surface,
- a coordinate of the at least one mobile device in a frame of reference associated with said interacting surface, and
- an orientation of the at least one mobile device according to an axis orthogonal to said interacting surface.

16. A system comprising the host device according to claim 15 and a mobile device (501, 505), wherein the mobile device (501, 505) comprises at least one location module for generating the at least one inductor magnetic field configured to induce the at least one electrical signal in the at least one electrical circuit (115) of the host device.

17. A system comprising the host device according to claim 15 and a mobile device (501, 505), wherein the mobile device comprises:
   i) at least one location module that generates the at least one inductor magnetic field configured to induce the at least one electrical signal in the at least one electrical circuit (115) of the host device, and
   ii) a user interface configured to trigger sending, by the at least one mobile device, of a command signal to the host device.

18. A mobile device (501, 505) in combination with a host device, where the host device has at least one electrical circuit (115) and an interacting surface, the mobile device comprising:
   at least one location module to generate an inductor magnetic field configured to induce an electrical signal in at the least one electrical circuit (115) of the host device; and
   a user interface configured to trigger sending, by the mobile device, of a command signal to the host device, wherein:
   the host device is configured to determine (1300) a current position of said mobile device relative to the interacting surface by the inductor magnetic field of the mobile device inducing the electrical signal in the at least one electrical circuit (115);
   the host device is configured to save (1301) said current position in a position history file, said position history file comprising a set of positions including one or more previous positions of said mobile device over a sliding temporal window, said position history file being stored in a memory device,
   the host device is configured to compare (1302) a form of an actual movement of said mobile device relative to the interacting surface determined utilizing said current position and at least one of said previous positions of said set of previous positions from said position history file with at least one reference movement diagram, said at least one reference movement diagram being associated with at least one reference movement of the mobile device relative to the interacting surface of the host device, and
   the host device is configured to determine that said form of the actual movement corresponds (1303) to said at least one reference movement and triggering (1304) a command of the host device according to said at least one reference movement,
   said current position comprising:
      a distance between the at least one mobile device and said interacting surface,
      a coordinate of the at least one mobile device in a frame of reference associated with said interacting surface, and
      an orientation of the at least one mobile device according to an axis orthogonal to said interacting surface.

19. The mobile device according to claim 18, wherein said command signal is a signal that activates the host device to determine the current position of the mobile device relative to the interacting surface of the host device.

20. The mobile device according to claim 18, wherein said command signal is a signal representing a current position of the user interface.

21. The mobile device according to claim 18, further comprising:
   a first location module installed in a main body of the mobile device; and
   a second location module installed in a secondary body of the mobile device,
   wherein the secondary body is adapted to move relative to the main body.

* * * * *